(12) United States Patent
Buege et al.

(10) Patent No.: US 11,772,890 B2
(45) Date of Patent: *Oct. 3, 2023

(54) REFUSE VEHICLE WITH ELECTRIC REACH APPARATUS

(71) Applicant: Oshkosh Corporation, Oshkosh, WI (US)

(72) Inventors: Wallace Buege, Oshkosh, WI (US); Martin Schimke, Oshkosh, WI (US); Joshua D. Rocholl, Rochester, MN (US); Jerrod Kappers, Oshkosh, WI (US); Andrew Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,872

(22) Filed: Dec. 15, 2021

(65) Prior Publication Data

US 2022/0106114 A1 Apr. 7, 2022

Related U.S. Application Data

(63) Continuation of application No. 16/851,180, filed on Apr. 17, 2020, now Pat. No. 11,254,500.

(Continued)

(51) Int. Cl.
*B65F 3/04* (2006.01)
*B65G 65/08* (2006.01)
(Continued)

(52) U.S. Cl.
CPC ............... *B65F 3/048* (2013.01); *B25J 9/102* (2013.01); *B25J 9/104* (2013.01); *B25J 9/1035* (2013.01);
(Continued)

(58) Field of Classification Search
CPC ........ B65F 2003/025; B65F 2003/0266; B65F 2003/0276; B65F 2003/0293; B65F 3/04;
(Continued)

(56) References Cited

U.S. PATENT DOCUMENTS 1,151,479 A 8/1915 Kurtz
2,263,199 A 11/1941 Co
(Continued)

FOREIGN PATENT DOCUMENTS

CA 1264702 1/1990
CA 2121055 10/1995
(Continued)

OTHER PUBLICATIONS

Boivin Evolution Products, https://en.bev.ca/produits, Retrieved on Aug. 31, 2020, 3 pages.
(Continued)

*Primary Examiner* — Kaitlin S Joerger
(74) *Attorney, Agent, or Firm* — Foley & Lardner LLP

(57) ABSTRACT

A refuse vehicle includes a chassis, tractive elements, a lift apparatus, and a reach assembly. The tractive elements couple with the chassis and support the refuse vehicle. The lift apparatus includes a track and a grabber assembly. The track includes a straight portion and a curved portion. The grabber assembly releasably grasps a refuse container and ascends or descends the track to lift and empty refuse into a body of the refuse vehicle. The reach assembly includes an outer member, a first extendable member, and a second extendable member. The first extendable member is received within an inner volume of the outer member and translates relative to the outer member. The second extendable member is received within an inner volume of the first extendable member and translates relative to the first extendable mem-
(Continued)

ber. The lift apparatus is fixedly coupled at an outer end of the second extendable member.

20 Claims, 23 Drawing Sheets

Related U.S. Application Data

(60) Provisional application No. 62/843,084, filed on May 3, 2019.

(51) Int. Cl.
| | |
|---|---|
| *B65G 65/23* | (2006.01) |
| *B25J 18/02* | (2006.01) |
| *B25J 9/12* | (2006.01) |
| *B25J 9/10* | (2006.01) |
| *B25J 19/00* | (2006.01) |
| *B25J 15/00* | (2006.01) |
| *B65F 3/02* | (2006.01) |

(52) U.S. Cl.
CPC ........... *B25J 9/123* (2013.01); *B25J 15/0028* (2013.01); *B25J 18/025* (2013.01); *B25J 19/0004* (2013.01); *B65G 65/08* (2013.01); *B65G 65/23* (2013.01); *B65F 2003/023* (2013.01); *B65F 2003/025* (2013.01); *B65F 2003/0269* (2013.01); *B65F 2210/168* (2013.01)

(58) Field of Classification Search
CPC .. B65F 3/048; B25J 9/123; B25J 9/104; B25J 15/0028
See application file for complete search history.

(56) References Cited

U.S. PATENT DOCUMENTS

| | | | |
|---|---|---|---|
| 3,195,744 A | 7/1965 | Wender | |
| 4,051,970 A * | 10/1977 | Ramsey | B66F 9/08 |
| | | | 187/229 |
| 4,219,298 A | 8/1980 | Stragier et al. | |
| 4,313,707 A | 2/1982 | Bingman et al. | |
| 4,401,407 A * | 8/1983 | Breckenridge | B65F 3/043 |
| | | | 414/733 |
| 4,461,608 A | 7/1984 | Boda | |
| 4,606,695 A | 8/1986 | Lenz | |
| 5,015,022 A * | 5/1991 | McGuire | E05B 65/0888 |
| | | | 292/278 |
| 5,158,340 A | 10/1992 | Boda | |
| 5,391,039 A | 2/1995 | Holtom | |
| 5,421,689 A | 6/1995 | Boivin | |
| 5,498,067 A | 3/1996 | Christenson | |
| 5,505,576 A * | 4/1996 | Sizemore | B65F 3/08 |
| | | | 414/718 |
| 5,527,098 A | 6/1996 | McKinney et al. | |
| 5,702,225 A | 12/1997 | Ghibaudo | |
| 5,720,589 A | 2/1998 | Christenson et al. | |
| 5,785,487 A | 7/1998 | McNeilus et al. | |
| 5,816,766 A | 10/1998 | Clark | |
| 5,833,428 A | 11/1998 | Szinte | |
| 5,919,027 A | 7/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,971,694 A | 10/1999 | McNeilus et al. | |
| 5,984,609 A | 11/1999 | Bartlett | |
| 5,988,970 A | 11/1999 | Holtom | |
| 5,988,972 A | 11/1999 | Boivin | |
| 6,033,176 A | 3/2000 | Bartlett | |
| 6,062,803 A | 5/2000 | Christenson | |
| 6,071,058 A | 6/2000 | Tetz et al. | |
| 6,089,813 A | 7/2000 | McNeilus et al. | |
| 6,095,744 A | 8/2000 | Harrison | |
| 6,120,235 A | 9/2000 | Humphries et al. | |
| 6,123,500 A | 9/2000 | McNeilus et al. | |
| 6,135,536 A | 10/2000 | Ciavaglia et al. | |
| 6,210,094 B1 | 4/2001 | McNeilus et al. | |
| 6,213,706 B1 | 4/2001 | Christenson | |
| 6,224,318 B1 | 5/2001 | McNeilus et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,390,758 B1 | 5/2002 | Mcneilus et al. | |
| 6,447,239 B2 | 9/2002 | Young et al. | |
| 6,474,928 B1 * | 11/2002 | Christenson | B65F 3/046 |
| | | | 414/408 |
| 6,485,079 B1 | 11/2002 | Brown et al. | |
| 6,491,489 B1 | 12/2002 | Stragier | |
| 6,494,665 B1 | 12/2002 | Bingman | |
| 6,520,008 B1 | 2/2003 | Stragier | |
| 6,565,305 B2 | 5/2003 | Schrafel | |
| 6,894,447 B1 * | 5/2005 | Friede | B60P 3/34 |
| | | | 296/26.03 |
| 7,070,382 B2 | 7/2006 | Pruteanu et al. | |
| 7,073,620 B2 | 7/2006 | Braun et al. | |
| 7,198,130 B2 | 4/2007 | Schimke | |
| 7,258,194 B2 | 8/2007 | Braun et al. | |
| 7,284,943 B2 | 10/2007 | Pruteanu et al. | |
| 7,357,203 B2 | 4/2008 | Morrow et al. | |
| 7,448,460 B2 | 11/2008 | Morrow et al. | |
| 7,556,468 B2 * | 7/2009 | Grata | B60P 3/125 |
| | | | 414/563 |
| 7,559,735 B2 * | 7/2009 | Pruteanu | B65F 3/08 |
| | | | 414/421 |
| 7,824,293 B2 | 11/2010 | Schimke | |
| 7,878,750 B2 | 2/2011 | Zhou et al. | |
| 7,931,103 B2 | 4/2011 | Morrow et al. | |
| 8,104,120 B2 | 1/2012 | Hornbach et al. | |
| 8,123,645 B2 | 2/2012 | Schimke | |
| 8,182,194 B2 | 5/2012 | Pruteanu et al. | |
| 8,215,892 B2 | 7/2012 | Calliari | |
| 8,251,420 B2 | 8/2012 | Mizuno et al. | |
| 8,337,352 B2 | 12/2012 | Morrow et al. | |
| 8,360,706 B2 | 1/2013 | Addleman et al. | |
| 8,540,475 B2 | 9/2013 | Kuriakose et al. | |
| 8,561,735 B2 | 10/2013 | Morrow et al. | |
| 8,807,613 B2 | 8/2014 | Howell et al. | |
| 8,864,613 B2 | 10/2014 | Morrow et al. | |
| 9,174,686 B1 | 11/2015 | Messina et al. | |
| 9,216,856 B2 | 12/2015 | Howell et al. | |
| 9,387,985 B2 | 7/2016 | Gillmore et al. | |
| 9,403,641 B1 * | 8/2016 | Ghibaudo | B65F 3/02 |
| 9,428,042 B2 | 8/2016 | Morrow et al. | |
| 9,624,033 B1 | 4/2017 | Price et al. | |
| 9,650,032 B2 | 5/2017 | Kotloski et al. | |
| 9,651,120 B2 | 5/2017 | Morrow et al. | |
| 9,656,659 B2 | 5/2017 | Shukla et al. | |
| 9,707,869 B1 | 7/2017 | Messina et al. | |
| 9,834,377 B1 * | 12/2017 | Hayes | B65F 3/041 |
| 9,880,581 B2 | 1/2018 | Kuriakose et al. | |
| 9,908,520 B2 | 3/2018 | Shukla et al. | |
| 9,970,515 B2 | 5/2018 | Morrow et al. | |
| 9,981,803 B2 | 5/2018 | Davis et al. | |
| 10,029,555 B2 | 7/2018 | Kotloski et al. | |
| 10,029,556 B2 | 7/2018 | Morrow et al. | |
| 10,160,438 B2 | 12/2018 | Shukla et al. | |
| 10,174,868 B2 * | 1/2019 | Ditty | F16L 3/015 |
| 10,196,205 B2 | 2/2019 | Betz et al. | |
| 10,267,390 B2 | 4/2019 | Morrow et al. | |
| 10,301,111 B2 | 5/2019 | Schell | |
| 10,308,429 B2 | 6/2019 | McNeilus et al. | |
| 10,357,995 B2 | 7/2019 | Palmer et al. | |
| 10,414,067 B2 | 9/2019 | Datema et al. | |
| 10,421,350 B2 | 9/2019 | Morrow et al. | |
| 10,435,026 B2 | 10/2019 | Shively et al. | |
| 10,457,134 B2 | 10/2019 | Morrow et al. | |
| 10,457,533 B2 | 10/2019 | Puszkiewicz et al. | |
| 10,558,234 B2 | 2/2020 | Kuriakose et al. | |
| 10,569,423 B1 | 2/2020 | Jones et al. | |

(56) References Cited

U.S. PATENT DOCUMENTS

| | | | |
|---|---|---|---|
| 10,578,195 B2 | 3/2020 | Steinberger et al. | |
| 10,584,775 B2 | 3/2020 | Steinberger et al. | |
| 10,661,986 B2* | 5/2020 | Price | B65F 3/046 |
| 10,703,356 B2 | 7/2020 | Lacroix et al. | |
| 10,801,243 B2 | 10/2020 | Nakatomi et al. | |
| 10,865,827 B2* | 12/2020 | Gentry | B65F 3/041 |
| 11,001,440 B2* | 5/2021 | Rocholl | B65F 3/041 |
| 11,254,500 B2* | 2/2022 | Buege | B25J 9/102 |
| 2002/0154973 A1 | 10/2002 | Bradshaw et al. | |
| 2004/0177934 A1 | 9/2004 | Olmsted | |
| 2006/0280582 A1* | 12/2006 | Kouri | B65F 3/043 |
| | | | 414/408 |
| 2011/0240777 A1 | 10/2011 | Johns et al. | |
| 2012/0261931 A1* | 10/2012 | Kang | B25J 1/04 |
| | | | 294/86.4 |
| 2014/0269145 A1 | 9/2014 | Fasana et al. | |
| 2015/0151433 A1 | 6/2015 | Rust et al. | |
| 2016/0044285 A1* | 2/2016 | Gasca | H04N 7/183 |
| | | | 348/148 |
| 2017/0044815 A1 | 2/2017 | Watanabe | |
| 2018/0155124 A1 | 6/2018 | Kay et al. | |
| 2018/0250847 A1 | 9/2018 | Wurtz et al. | |
| 2018/0326832 A1 | 11/2018 | Kotloski et al. | |
| 2019/0091890 A1 | 3/2019 | Rocholl et al. | |
| 2019/0111910 A1 | 4/2019 | Shukla et al. | |
| 2019/0121353 A1 | 4/2019 | Datema et al. | |
| 2019/0161272 A1 | 5/2019 | Betz et al. | |
| 2019/0193934 A1 | 6/2019 | Rocholl et al. | |
| 2019/0242460 A1 | 8/2019 | Morrow et al. | |
| 2019/0322321 A1 | 10/2019 | Schwartz et al. | |
| 2019/0325220 A1 | 10/2019 | Wildgrube et al. | |
| 2019/0344475 A1 | 11/2019 | Datema et al. | |
| 2019/0360600 A1 | 11/2019 | Jax et al. | |
| 2019/0366828 A1 | 12/2019 | Morrow et al. | |
| 2020/0031641 A1 | 1/2020 | Puszkiewicz et al. | |
| 2020/0039341 A1 | 2/2020 | Morrow et al. | |
| 2020/0078986 A1 | 3/2020 | Clifton et al. | |
| 2020/0102145 A1 | 4/2020 | Nelson et al. | |
| 2020/0180860 A1* | 6/2020 | Searle | B65F 3/0203 |
| 2020/0200237 A1 | 6/2020 | Steinberger et al. | |
| 2020/0200238 A1 | 6/2020 | Steinberger et al. | |
| 2020/0230841 A1 | 7/2020 | Datema et al. | |
| 2020/0230842 A1 | 7/2020 | Datema et al. | |
| 2020/0262328 A1 | 8/2020 | Nelson et al. | |
| 2020/0262366 A1 | 8/2020 | Wildgrube et al. | |
| 2020/0265656 A1 | 8/2020 | Koga et al. | |
| 2021/0039880 A1 | 2/2021 | Boivin et al. | |
| 2021/0122568 A1* | 4/2021 | Boivin | B65F 3/08 |

FOREIGN PATENT DOCUMENTS

| | | |
|---|---|---|
| CA | 2373724 | 8/2003 |
| CA | 3072106 | 2/2019 |
| CN | 105210518 | 1/2016 |
| CN | 105501766 B | 3/2018 |
| CN | 107985873 A | 5/2018 |
| DE | 10 2006 032 206 A1 | 1/2008 |
| DE | 10 2007 026 418 A1 | 12/2008 |
| DE | 10 2008 013 940 A1 | 9/2009 |
| EP | 0 620 167 B1 | 10/1994 |
| GB | 2 129 086 A | 5/1984 |
| GB | 2 405 395 A | 3/2005 |
| JP | H11-168925 A | 6/1999 |
| JP | 2016-068200 A | 5/2016 |
| WO | WO-2019/033201 A1 | 2/2019 |
| WO | WO-2021/068063 A1 | 4/2021 |

OTHER PUBLICATIONS

Boivin Evolution, Introducing the First 100% Electric Automated Arm and Collection Body, URL: https://28d16714-b3dd-403e-a844-10d42b38b19e.filesusr.com/ugd/6b1a10_9255a4d94f054fd48e688e6fe30c6874.pdf, printed on Aug. 31, 2020, 2 pages.

* cited by examiner

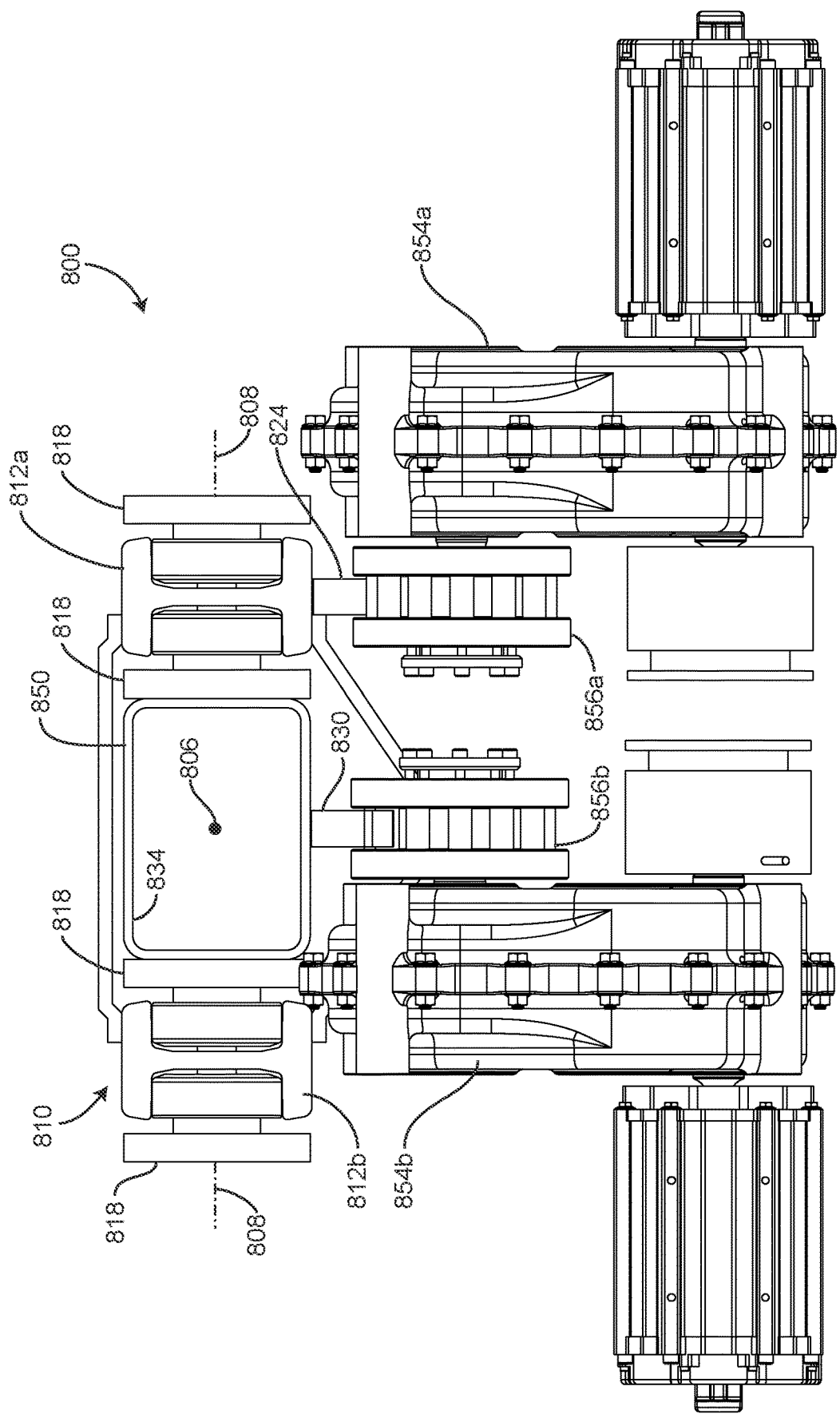

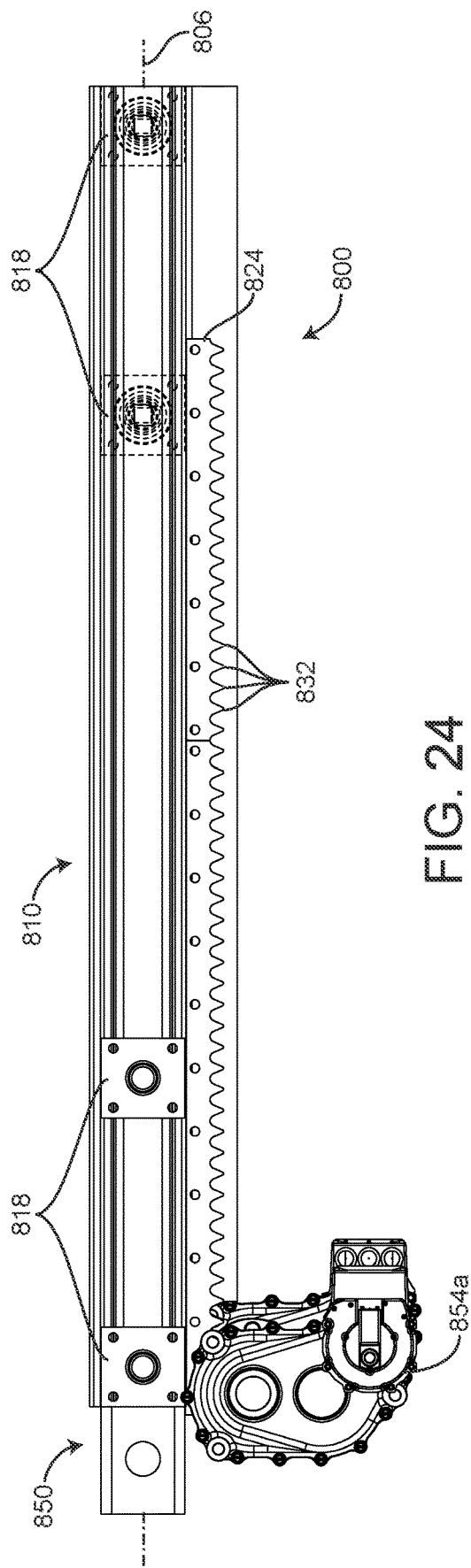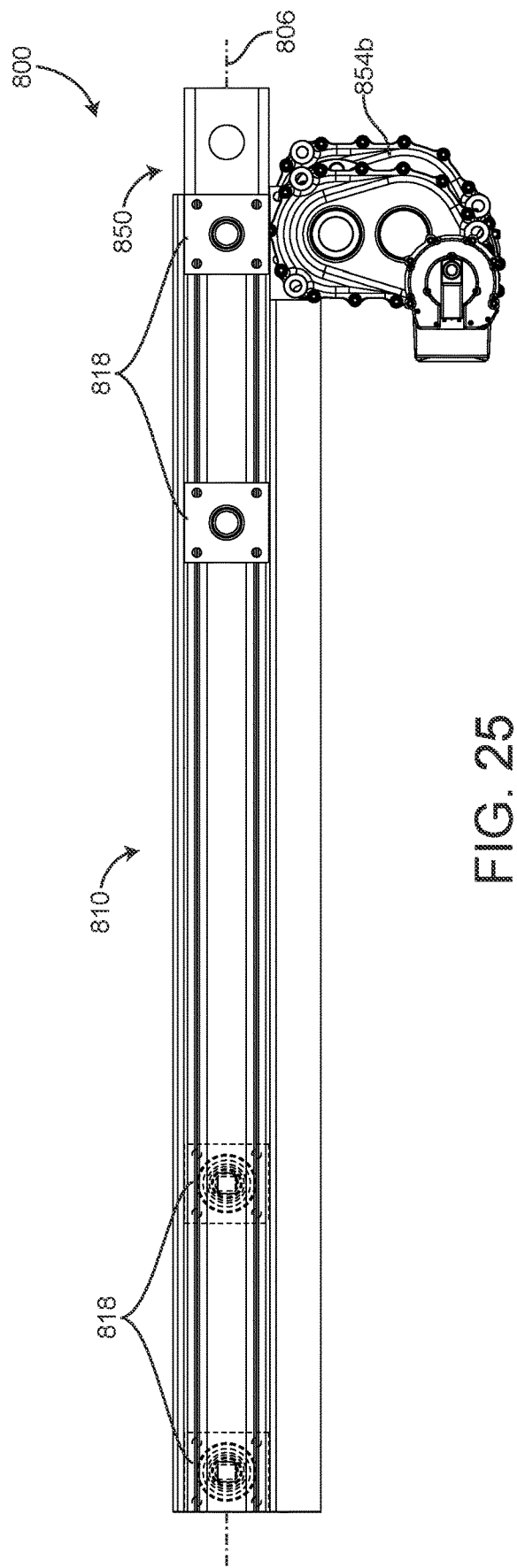

REFUSE VEHICLE WITH ELECTRIC REACH APPARATUS

CROSS-REFERENCE TO RELATED PATENT APPLICATION

This application is a continuation of U.S. application Ser. No. 16/851,180, filed Apr. 17, 2020, which claims the benefit of and priority to U.S. Provisional Patent Application No. 62/843,084, filed May 3, 2019, both of which are incorporated herein by reference in their entireties.

BACKGROUND

The present application generally relates to the field of refuse vehicles. More specifically, the present application relates to reach apparatuses for refuse vehicles.

SUMMARY

One implementation of the present disclosure is a refuse vehicle, according to an exemplary embodiment. The refuse vehicle includes a chassis, multiple tractive elements, a lift apparatus, and a reach assembly. The multiple tractive elements are coupled with the chassis and configured to support the refuse vehicle. The lift apparatus includes a track and a grabber assembly. The track includes a straight portion and a curved portion. The grabber assembly is configured to releasably grasp a refuse container and ascend or descend the track to lift and empty refuse into a body of the refuse vehicle. The reach assembly includes an outer member, a first extendable member, and a second extendable member. The first extendable member is configured to be received within an inner volume of the outer member and translate relative to the outer member. The second extendable member is configured to be received within an inner volume of the first extendable member and translate relative to the first extendable member. The lift apparatus is fixedly coupled at an outer end of the second extendable member.

Another implementation of the present disclosure is a reach assembly for a refuse vehicle, according to an exemplary embodiment. The reach assembly includes an outer member, a first extendable member, a second extendable member, a first electric motor, and a second electric motor. The outer member is fixedly coupled with the refuse vehicle. The first extendable member is configured to be received within an inner volume of the outer member and translate relative to the outer member in a longitudinal direction of the outer member. The first extendable member includes a first rack extending in the longitudinal direction. The second extendable member is configured to be received within an inner volume of the first extendable member and translate relative to the first extendable member in the longitudinal direction. The second extendable member includes a second rack extending in the longitudinal direction. A lift apparatus is fixedly coupled at an outer end of the second extendable member. The first electric motor is fixedly coupled with the outer member and configured to drive a first pinion that engages the first rack to translate the first extendable member relative to the outer member. The second electric motor is fixedly coupled with the first extendable member and configured to drive a second pinion that engages the second rack to translate the second extendable member relative to the first extendable member.

Another implementation of the present disclosure is a reach assembly for a refuse vehicle, according to an exemplary embodiment. The reach assembly includes an outer member, a first extendable member, a second extendable member, a first electric linear actuator, and a second electric linear actuator. The outer member is fixedly coupled with the refuse vehicle. The first extendable member is configured to be received within an inner volume of the outer member and translate relative to the outer member in a longitudinal direction of the outer member. The second extendable member is configured to be received within an inner volume of the first extendable member and translate relative to the first extendable member in the longitudinal direction. A lift apparatus is fixedly coupled at an outer end of the second extendable member. The first electric linear actuator fixedly coupled at a first end with the outer member and fixedly coupled at a second end with the first extendable member. The first electric linear actuator is configured to extend or retract to translate the first extendable member relative to the outer member. The second electric linear actuator is fixedly coupled at a first end with the first extendable member and fixedly coupled at a second end with the second extendable member. The second electric linear actuator is configured to extend or retract to translate the second extendable member relative to the first extendable member.

Another implementation of the present disclosure is a refuse vehicle, according to an exemplary embodiment. The refuse vehicle includes a chassis, multiple tractive elements, a lift apparatus, and a reach assembly. The multiple tractive elements are coupled with the chassis and configured to support the refuse vehicle. The lift apparatus includes a track and a grabber assembly. The track includes a straight portion and a curved portion. The grabber assembly is configured to releasably grasp a refuse container and ascend or descend the track to lift and empty refuse into a body of the refuse vehicle. The reach assembly includes an outer member fixedly coupled with the refuse vehicle, and a first extendable member. The first extendable member is configured to be received within an inner volume of the outer member and translate relative to the outer member.

Another implementation of the present disclosure is a reach assembly for a refuse vehicle, according to an exemplary embodiment. The reach assembly includes an outer member, a first extendable member, a second extendable member, and a first electric linear actuator. The outer member is fixedly coupled with the refuse vehicle. The first extendable member is configured to be received within an inner volume of the outer member and translate relative to the outer member in a longitudinal direction of the outer member. The second extendable member is configured to be received within an inner volume of the first extendable member and translate relative to the first extendable member in the longitudinal direction. A lift apparatus is fixedly coupled at an outer end of the second extendable member. The first electric linear actuator is fixedly coupled at a first end with the outer member and fixedly coupled at a second end with the first extendable member. The first electric linear actuator is configured to extend or retract to translate the first extendable member relative to the outer member.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 23 is a front view of the reach assembly of FIG. 6, according to an exemplary embodiment;

FIG. 24 is a right view of the reach assembly of FIG. 6, according to an exemplary embodiment;

FIG. 25 is a left view of the reach assembly of FIG. 6, according to an exemplary embodiment;

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a fully electric reach assembly includes telescoping members. The telescoping members are received within each other and slidably couple with corresponding surfaces. The telescoping members can be driven to slidably translate relative to each other with an electric motor, an electric linear actuator, a gearing system, a rack and roller pinion system, a triple rack system, a chain system, etc. The reach assembly can be fixedly coupled with a refuse vehicle at a proximate end and may be configured to extend in a lateral direction of the refuse vehicle. The reach assembly includes a track and a grabber assembly at a distal end configured to releasably secure and lift/dump refuse containers.

Figure 1:
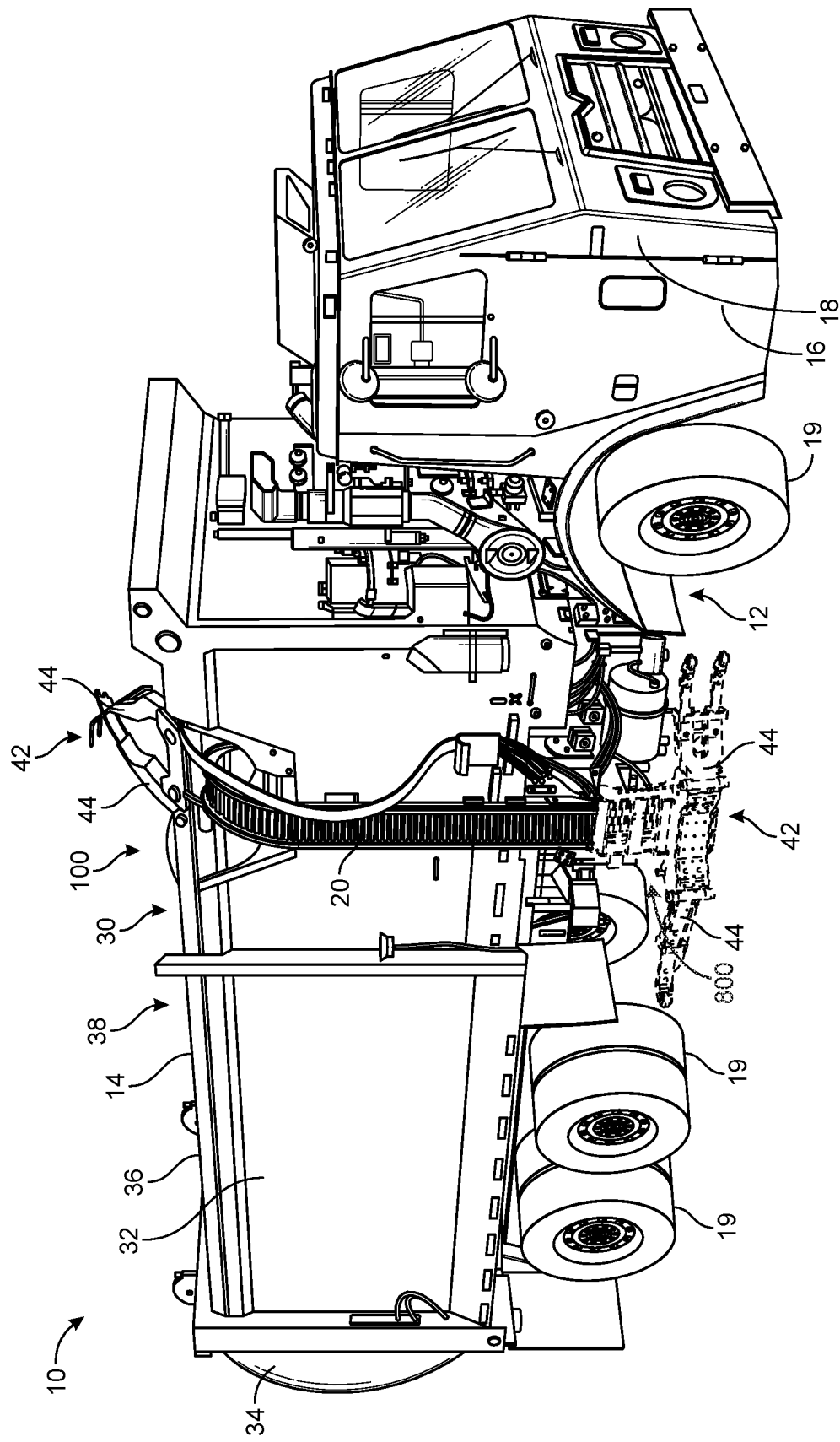
FIG. 1 is a perspective view of a refuse vehicle, shown to include a loading assembly, a track, and a grabber assembly, according to an exemplary embodiment.

As shown in FIG. 1, refuse vehicle 10 includes a chassis, shown as frame 12; a body assembly, shown as body 14, coupled to frame 12 (e.g., at a rear end thereof, etc.); and a cab, shown as cab 16, coupled to frame 12 (e.g., at a front end thereof, etc.). Cab 16 may include various components to facilitate operation of refuse vehicle 10 by an operator (e.g., a seat, a steering wheel, hydraulic controls, a user interface, switches, buttons, dials, etc.). As shown in FIG. 1, refuse vehicle 10 includes a prime mover, shown as engine 18, coupled to frame 12 at a position beneath cab 16. Engine 18 is configured to provide power to a plurality of tractive elements, shown as wheels 19, and/or to other systems of refuse vehicle 10 (e.g., a pneumatic system, a hydraulic system, an electric system, etc.). Engine 18 may be configured to utilize one or more of a variety of fuels (e.g., gasoline, diesel, bio-diesel, ethanol, natural gas, etc.), according to various exemplary embodiments. According to an alternative embodiment, engine 18 additionally or alternatively includes one or more electric motors coupled to frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of refuse vehicle 10.

According to an exemplary embodiment, refuse vehicle 10 is configured to transport refuse from various waste receptacles within a municipality to a storage and/or processing facility (e.g., a landfill, an incineration facility, a recycling facility, etc.). As shown in FIG. 1, body 14 includes a plurality of panels, shown as panels 32, a tailgate 34, and a cover 36. Panels 32, tailgate 34, and cover 36 define a collection chamber (e.g., hopper, etc.), shown as refuse compartment 30. Loose refuse may be placed into refuse compartment 30 where it may thereafter be compacted. Refuse compartment 30 may provide temporary storage for refuse during transport to a waste disposal site and/or a recycling facility. In some embodiments, at least a portion of body 14 and refuse compartment 30 extend in front of cab 16. According to the embodiment shown in FIG. 1, body 14 and refuse compartment 30 are positioned behind cab 16. In some embodiments, refuse compartment 30 includes a hopper volume and a storage volume. Refuse may be initially loaded into the hopper volume and thereafter compacted into the storage volume. According to an exemplary embodiment, the hopper volume is positioned between the storage volume and cab 16 (e.g., refuse is loaded into a position of refuse compartment 30 behind cab 16 and stored in a position further toward the rear of refuse compartment 30). In other embodiments, the storage volume is positioned between the hopper volume and cab 16 (e.g., a rear-loading refuse vehicle, etc.).

As shown in FIG. 1, refuse vehicle 10 includes first lift mechanism/system (e.g., a front-loading lift assembly, etc.), shown as lift assembly 100. Lift assembly 100 includes a grabber assembly, shown as grabber assembly 42, movably coupled to a track, shown as track 20, and configured to move along an entire length of track 20. According to the exemplary embodiment shown in FIG. 1, track 20 extends along substantially an entire height of body 14 and is configured to cause grabber assembly 42 to tilt near an upper height of body 14. In other embodiments, track 20 extends along substantially an entire height of body 14 on a rear side of body 14. Refuse vehicle 10 can also include a reach system or assembly coupled with a body or frame of refuse vehicle 10 and lift assembly 100. The reach system can include telescoping members, a scissors stack, etc., or any other configuration that can extend or retract to provide additional reach of grabber assembly 42 for refuse collection.

Figure 3:
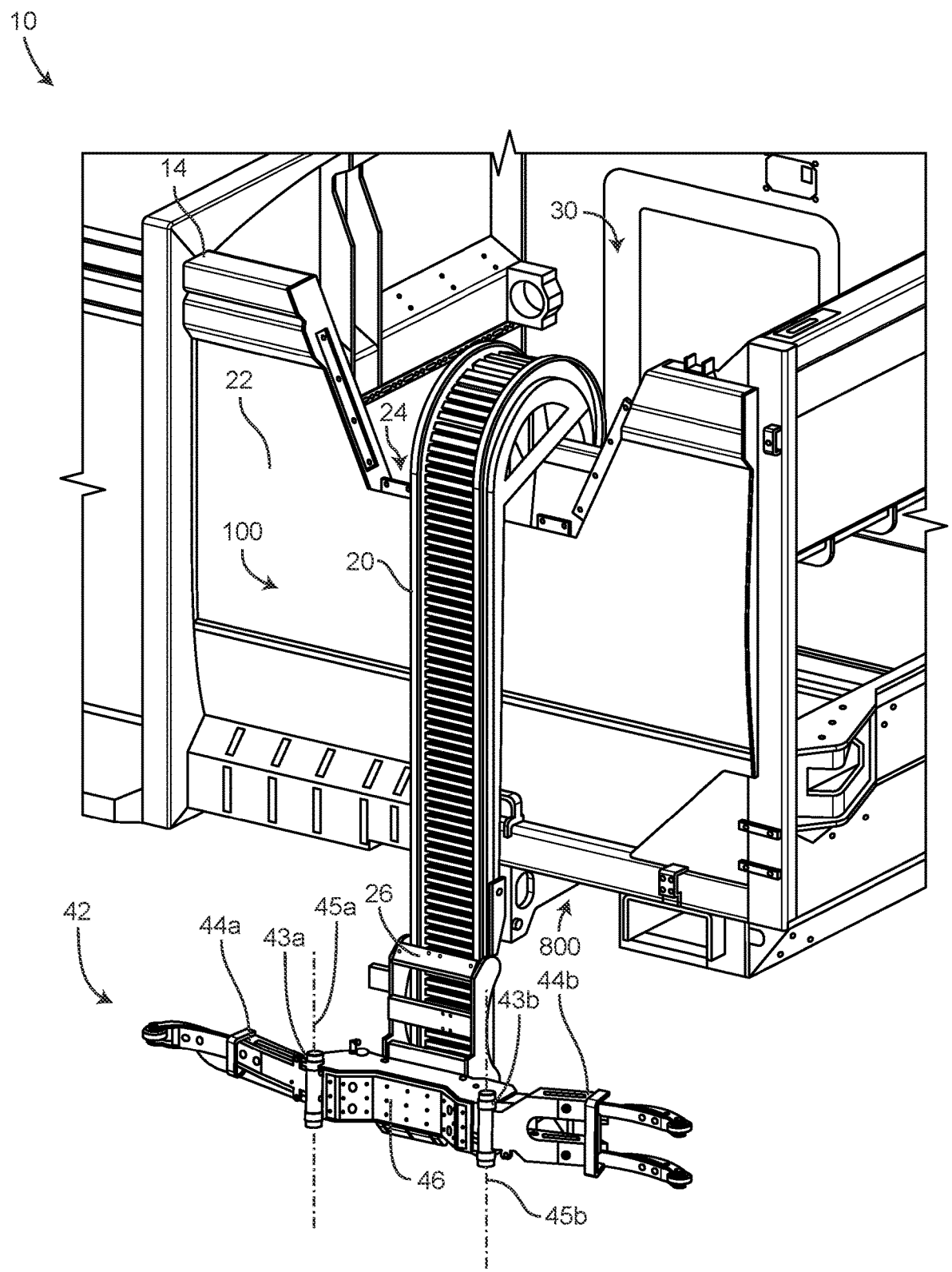
FIG. 3 is a perspective view of the loading assembly of the refuse vehicle of FIG. 1, shown to include the grabber assembly of FIG. 1, according to an exemplary embodiment.

Referring still to FIG. 1, grabber assembly 42 includes a pair of grabber arms shown as grabber arms 44. Grabber arms 44 are configured to rotate about an axis extending through a bushing. Grabber arms 44 are configured to releasably secure a refuse container to grabber assembly 42, according to an exemplary embodiment. Grabber arms 44 rotate about the axis extending through the bushing to transition between an engaged state (e.g., a fully grasped configuration, a fully grasped state, a partially grasped configuration, a partially grasped state) and a disengaged state (e.g., a fully open state/configuration, a fully released state/configuration, a partially open state/configuration, a partially released state/configuration). In the engaged state, grabber arms 44 are rotated towards each other such that the refuse container is grasped therebetween. In the disengaged state, grabber arms 44 rotate outwards (as shown in FIG. 3) such that the refuse container is not grasped therebetween. By transitioning between the engaged state and the disengaged state, grabber assembly 42 releasably couples the refuse container with grabber assembly 42. Refuse vehicle 10 may pull up along-side the refuse container, such that the refuse container is positioned to be grasped by the grabber assembly 42 therebetween. Grabber assembly 42 may then transition into an engaged state to grasp the refuse container. After the refuse container has been securely grasped, grabber assembly 42 may be transported along track 20 with the refuse container. When grabber assembly 42 reaches the end of track 20, grabber assembly 42 may tilt and empty the contents of the refuse container in refuse compartment 30. The tilting is facilitated by the path of track 20. When the contents of the refuse container have been emptied into refuse compartment 30, grabber assembly 42 may descend along track 20, and return the refuse container to the ground. Once the refuse container has been placed on the ground, the grabber assembly may transition into the disengaged state, releasing the refuse container.

Refuse vehicle 10 can also include a reach assembly 800 that is configured to operate to facilitate extension and retraction of grabber assembly 42 and/or lift assembly 100. Reach assembly 800 can be configured to extend or retract from a side (e.g., a lateral side) of refuse vehicle 10 to facilitate lateral reach for grabber assembly 42 to releasably grasp refuse containers that may be positioned a lateral distance from refuse vehicle 10 (e.g., on a curbside). In some embodiments, reach assembly 800 is configured to extend or retract to laterally translate grabber assembly 42 and lift assembly 100. In some embodiments, reach assembly 800 is configured to extend or retract to laterally translate grabber assembly 42 and a portion of lift assembly 100 (e.g., a portion of track 20). Reach assembly 800 can be fixedly coupled, attached, secured, etc., with frame 12 of refuse vehicle 10 or may be fixedly coupled, attached, secured, etc., with body 14 of refuse vehicle 10.

Figure 2:
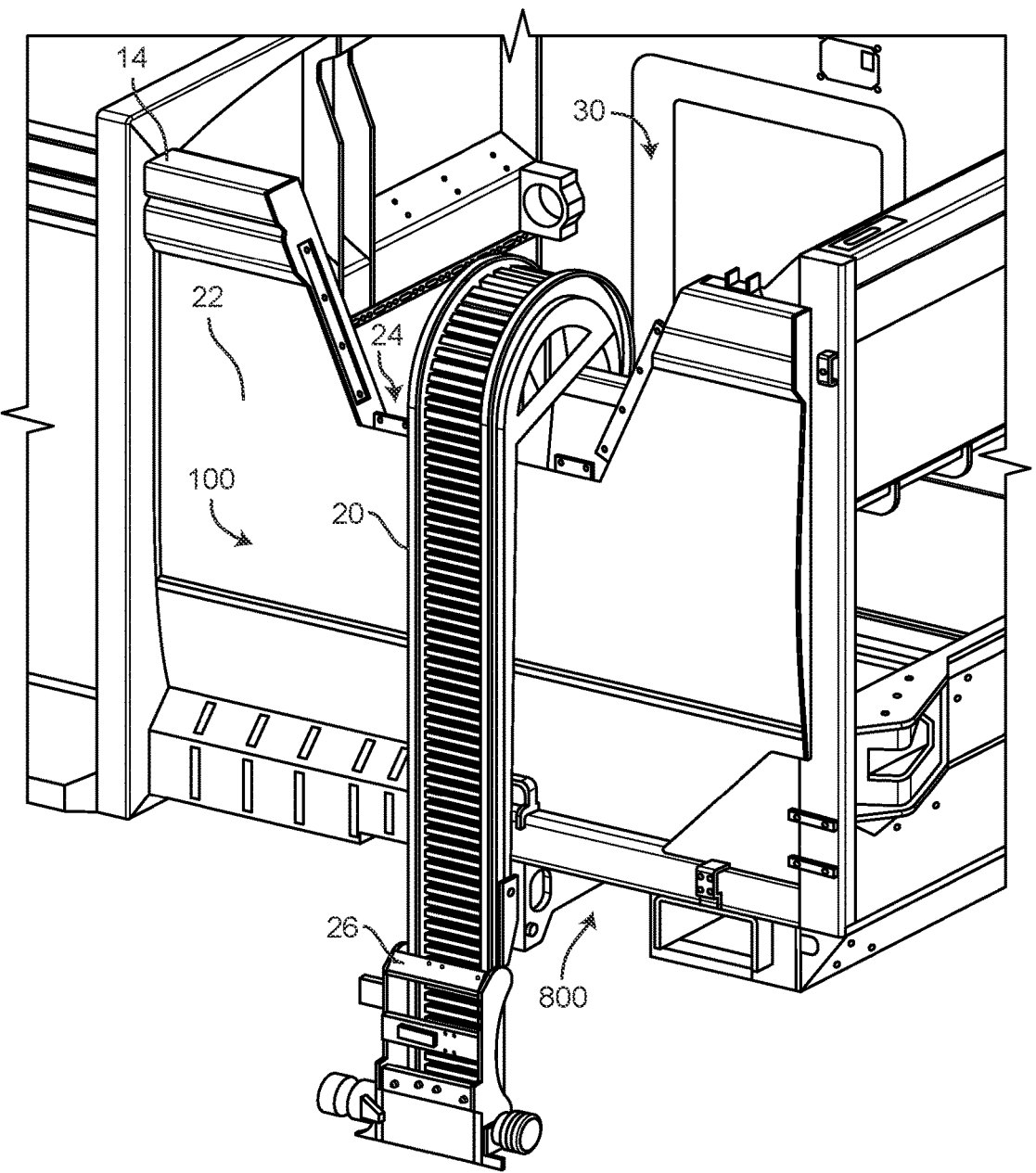
FIG. 2 is a perspective view of the loading assembly of the refuse vehicle of FIG. 1, according to an exemplary embodiment.

Referring now to FIGS. 2-3, the lift assembly 100 is shown in greater detail, according to an exemplary embodiment. Lift assembly 100 is shown to include track 20, and a coupling member, shown as carrier 26. Track 20 is configured to extend along substantially the entire height of body 14, according to the exemplary embodiment shown. Body 14 is shown to include a loading section, shown as loading section 22. Loading section 22 is shown to include a recessed portion, shown as recessed portion 24. Recessed portion 24 is configured to allow track 20 to curve through recessed portion 24, such that track 20 may be configured to empty a refuse bin (e.g., a garbage can) releasably couple to grabber assembly 42 in refuse compartment 30.

Still referring to FIGS. 2-3, carrier 26 is shown coupled with track 20. Carrier 26 is coupled to track 20 such that carrier 26 may move along an entire path length of track 20. Carrier 26 may removably couple with grabber assembly 42, thereby removably coupling grabber assembly 42 to track 20, and allowing grabber assembly 42 to travel along the entire path length of track 20. Carrier 26 removably couples (e.g., by removable fasteners) to a carriage portion of grabber assembly 42, shown as carriage 46. Grabber assembly 42 is shown to include grabber arms, shown as first grabber arm 44a and second grabber arm 44b, according to an exemplary embodiment. First grabber arm 44a and second grabber arm 44b are each configured to pivot about 45a and axis 45b, respectively. Axis 45a is defined as an axis longitudinally extending through substantially an entire length of a first adapter or bushing assembly, shown as first adapter assembly 43a, and axis 45b is defined as an axis longitudinally extending through substantially an entire length of a second adapter or bushing assembly, shown as second adapter assembly 43b. First adapter assembly 43a fixedly couples to a first end of carriage 46, and rotatably couples to first grabber arm 44a. Second adapter assembly 43b fixedly couples to a second end of carriage 46, and rotatably couples to second grabber arm 44b. First adapter assembly 43a and second adapter assembly 43b couple first grabber arm 44a and second grabber arm 44b to carriage 46, and allow first grabber arm 44a and second grabber arm 44b to rotate about axis 45a and axis 45b, respectively.

Figure 4:
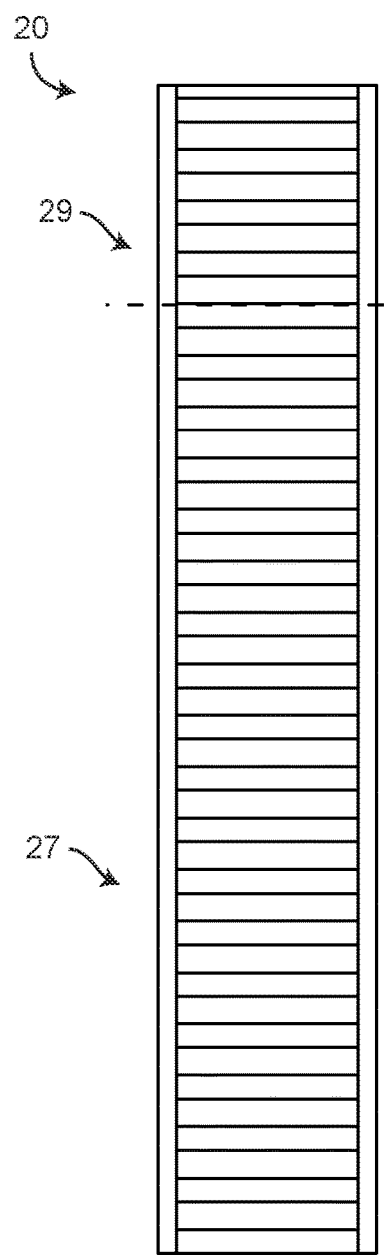
FIG. 4 is a front view of the track of FIG. 1, according to an exemplary embodiment.
Figure 5:
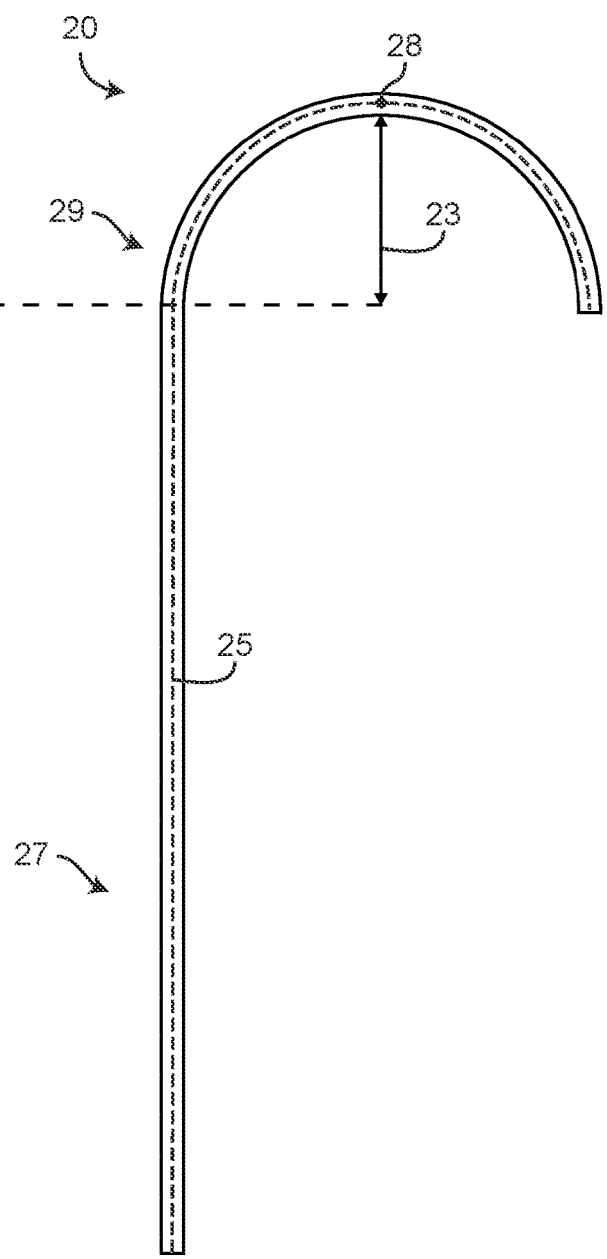
FIG. 5 is a side view of the track of FIG. 1, according to an exemplary embodiment.

Referring now to FIGS. 4-5, the track 20 is shown in greater detail according to an exemplary embodiment. FIG. 4 shows a front view of track 20, and FIG. 5 shows a side view of track 20, according to an exemplary embodiment. Track 20 is shown to include a straight portion 27, and a curved portion 29. Straight portion 27 may be substantially vertical, and/or substantially parallel to loading section 22 of body 14, according to an exemplary embodiment. Curved portion 29 may have a radius of curvature, shown as radius 23, according to an exemplary embodiment. In some embodiments, curved portion 29 has a constant radius of curvature (e.g., curved portion 29 has a constant radius 23 along all points on a path of curved portion 29), while in other embodiments, curved portion 29 has a non-constant radius of curvature (e.g., curved portion 29 has a non-constant radius 23 along various points on the path of curved portion 29). According to an exemplary embodiment, straight portion 27 has an infinite radius of curvature. According to an exemplary embodiment, grabber assembly 42 may travel along a path of track 20, shown as path 25. Track 20 may be configured to tilt grabber assembly 42 to empty contents of a refuse container when grabber assembly 42 travels along path 25 and travels past a point on path 25, shown as point 28. When grabber assembly 42 travels along path 25 past point 28, grabber assembly 42 may tilt, emptying the contents of the refuse container in refuse compartment 30.

Referring now to FIGS. 6, 7, and 23-29, reach assembly 800 (e.g., a reach assembly, an extension assembly, a reach system, etc.) can be used on refuse vehicle 10. Reach assembly 800 includes a rear, a first, or a proximate end 802, and a front, a second, or a distal end 804. Proximate end 802 of reach assembly 800 can be removably or fixedly coupled with refuse vehicle 10. For example, proximate end 802 can be removably or fixedly coupled with frame 12, body 14, a chassis, etc., of refuse vehicle 10. Reach assembly 800 includes track 20 and grabber assembly 42 at distal end 804. Track 20 and grabber assembly 42 can be removably or fixedly coupled with distal end 804 of reach assembly 800.

Reach assembly 800 includes a longitudinal axis 806 that extends therethrough and defines a longitudinal direction. Reach assembly 800 also includes a lateral axis 808 that extends therethrough perpendicular to longitudinal axis 806 and defines a lateral direction. In some embodiments, lateral axis 808 is substantially parallel with a longitudinal axis of refuse vehicle 10.

Reach assembly 800 includes a body, a frame, a structural support member, a telescoping member, a tracked member, an outer member, a body member, etc., shown as body 801. Body 801 can be fixedly or removably coupled with a body or frame of refuse vehicle 10 through connecting portions 803. Connecting portions 803 can extend from opposite lateral and/or longitudinal sides of body 801 and can include holes, apertures, etc., configured to receive fasteners therethrough to removably couple reach assembly 800 with refuse vehicle 10 (e.g., with an underside of refuse vehicle 10). Connecting portions 803 can be generally planar members, flanges, etc. Reach assembly 800 includes a first extendable member, a bar, a beam, a hollow member, etc., shown as extendable member 810. Extendable member 810 configured to extend or retract in the longitudinal direction relative to body 801 to facilitate grabber assembly 42 reaching various refuse containers (e.g., containers that are a distance away from refuse vehicle 10). Extendable member 810 can be configured to extend or retract in the longitudinal direction to increase or decrease an overall longitudinal length of reach assembly 800. In some embodiments, extendable member 810 is driven by an electric motor 854a. Extendable member 810 can be received within and slidably couple with an inner volume, a channel, a longitudinal track, a recess, a bore, a hollow portion, a cavity, grooves, etc., of body 801. Body 801 can have a generally rectangular or square shape and can receive extendable member 810 therewithin. The inner volume of body 801 can correspond in shape with an outer shape of extendable member 810.

Extendable member 810 includes a pair of elongated members, rigid members, beams, bars, I-beams, U-beams, T-beams, etc., shown as frame members 812. Specifically, extendable member 810 include frame member 812a and frame member 812b laterally spaced apart a distance 814. Frame member 812a and frame member 812b extend along or parallel to longitudinal axis 806 and can be substantially parallel with each other. Frame member 812a and 812b can be fixedly coupled with each other through laterally extending members 846 and 848 (see FIG. 29) therebetween. In some embodiments, laterally extending members 846 and 848 are formed steel sheets. In some embodiments, laterally extending members 846 and 848 extends therebetween frame members 812 on opposite vertical sides (e.g., on a top side and a bottom side of frame members 812). Frame member 812a and frame member 812b can each include or define a longitudinally extending channel, groove, recess, track, etc., shown as tracks 816. Tracks 816 can be defined on outer lateral sides of frame members 812. Tracks 816 are configured to receive and slidably couple with one or more sliders, slidable members, block, rollers, rolling members, linear bearings, etc., shown as linear bearings 818. Linear bearings 818 can be translatably coupled with frame members 812. In some embodiments, linear bearings 818 are fixedly coupled with body 801. For example, linear bearings 818 can be fixedly coupled with an interior surface of body 801 and slidably or translatably coupled with tracks 816 of frame members 812 to facilitate a translatable or slidable coupling therebetween extendable member 810 and body 801.

Extendable member 810 includes a rack, an engagement member, a plurality of teeth, etc., shown as rack 824. Rack 824 extends longitudinally along one or both of frame members 812. In some embodiments, rack 824 extends longitudinally along a bottom surface of one or both of frame members 812. Rack 824 can be fixedly coupled with frame member 812a. Rack 824 includes teeth, projections, engagement members, protrusions, etc., shown as teeth 828. Teeth 828 are spaced apart and extend along substantially an entire length of rack 824. In some embodiments, rack 824 extends along the entire length of frame member 812a.

Electric motor 854a can be fixedly coupled with body 801. Electric motor 854a is configured to drive a gear, a roller pinion, an engagement member, a rotational member, a drive member, etc., shown as roller pinion 856a. Roller pinion 856a is configured to engage or mesh with teeth 828 of rack 824. Electric motor 854a can exert a torque on roller pinion 856a through a gearbox which is transferred to a translational force through the engagement between roller pinion 856a and rack 824. Roller pinion 856a is driven to rotate by electric motor 854a, thereby translating extendable member 810 relative to body 801 in the longitudinal direction (e.g., along longitudinal axis 806). Electric motor 854a can be operated in either direction to translate extendable member 810 relative to body 801 (e.g., to extend extendable member 810 or to retract extendable member 810). Electric motors 854 can transfer torque to roller pinions 856 through gearboxes 868 (see FIG. 28). Electric motors 854 can each include a brake 882 (e.g., an electric brake). Brake 882 can be configured to activate to lock an output driveshaft of electric motor 854, thereby locking reach assembly 800 at a current degree of extension or retraction.

Extendable member 810 can include a channel, an inner volume, a space, a recess, etc., shown as inner tracks 822. Extendable member 810 defines a space therebetween frame members 812 that can receive another extendable member, bar, elongated member, etc., shown as extendable member 850. Extendable member 850 can be received therewithin extendable member 810. Extendable member 850 can be received through a center or extendable member 810, or can be received within a laterally offset channel of extendable member 810. In some embodiments, extendable member 850 is fixedly coupled with linear bearings 818 that are received within and translatably and slidably couple with inner tracks 822. In this way, extendable member 850 can translate along inner tracks 822 relative to extendable member 810. Extendable member 850 includes a body portion, a frame, an elongated member, etc., shown as body 834. Body 834 can have an outer cross sectional shape that corresponds to the shape of the space/volume defined between frame members 812. Body 834 is slidably and translatably coupled with inner tracks 822 of frame members 812.

Body 834 slidably and translatably couples with extendable member 810. Body 834 can include linear bearings 818 disposed therebetween extendable member 810 and body 834. In some embodiments, linear bearings 818 are positioned on opposite lateral sides or surfaces of body 834 and are received within tracks 822 of extendable member 810. Linear bearings 818 can slidably couple with tracks 822 of extendable member 810 to facilitate translation of extendable member 850 relative to extendable member 810 in a direction parallel with longitudinal axis 806.

Extendable member 850 includes a rack 830 that extends longitudinally along body 834 of extendable member 850. Rack 830 can be the same as or similar to rack 824 and includes teeth 832. Teeth 832 can be the same as or similar to teeth 828 of rack 824. Electric motor 854*b* is fixedly coupled with one or both of frame members 812. In some embodiments, electric motor 854*b* is fixedly coupled with extendable member 810. Electric motor 854*b* is configured to drive roller pinion 856*b*. Roller pinion 856*b* is configured to mesh with or engage teeth 832 of rack 830 to drive extendable member 850 to translate relative to extendable member 810 in a longitudinal direction or a direction that is parallel with longitudinal axis 806. Electric motor 854*b* exerts a torque on roller pinion 856*b* through gearbox 868*b*, thereby driving extendable member 850 to translate relative to extendable member 810. In some embodiments, electric motor 854*b* can be operated in either direction to extend or retract extendable member 850 relative to extendable member 810. Electric motor 854*b* can be locked by brake 882*b*. Brake 882*b* can be activated to exert a locking force on an output driveshaft of electric motor 854*b*, thereby facilitating preventing extendable member 850 from translating relative to extendable member 810.

Extendable member 850 is coupled with track 20 at a distal end. In some embodiments, extendable member 850 is fixedly coupled with track 20. In other embodiments, extendable member 850 is fixedly and removably coupled with track 20. In some embodiments, extendable member 850 is fixedly coupled with a first piece or portion of track 20 that is free to translate relative to a second (e.g., an upper) piece or portion of track 20.

Roller pinion 856*b* can be driven by electric motor 854*b* to translate extendable member 850 relative to extendable member 810. In this way, electric motor 854*b* can be operated to increase or decrease an overall length of reach assembly 800. Electric motors 854 can be operated by a controller or a control system. In some embodiments, electric motors 854 are operated simultaneously such that extendable member 810 translates longitudinally relative to body 801 while extendable member 850 translates longitudinally relative to extendable member 810. In other embodiments, electric motor 854*a* is first operated until extendable member 810 is fully extended, and then electric motor 854*b* is operated until extendable member 850 is fully extended relative to extendable member 810.

Reach assembly 800 is shown in FIGS. 6, 7, and 23-29 as a telescoping tubular apparatus that is driven to extend or retract by electric motors 854. While reach assembly 800 is only shown to include two extendable members (e.g., extendable member 810 and extendable member 850), reach assembly 800 can include any number of telescoping members that are configured to be received within each other and translate longitudinally to extend/retract.

Electric motors 854 can receive power from a battery, a collection of batteries, or any other power storage device. Electric motors 854 can operate to extend and retract reach assembly 800, thereby facilitating a larger longitudinal reach of reach assembly 800.

Reach assembly 800 can extend laterally from refuse vehicle 10. In some embodiments, longitudinal axis 806 of reach assembly 800 is perpendicular to a longitudinal axis of refuse vehicle 10. Reach assembly 800 facilitates reaching distant refuse collection bins so that the refuse collection bins or containers can be releasably secure or grasped at carriage 26 (or with grabber assembly 42) and lifted along track 20.

In some embodiments, reach assembly 800 includes feedback sensors. The feedback sensors can be configured to measure or monitor operation of electric motors 854 to monitor a degree of extension of reach assembly 800. In some embodiments, distance or proximity sensors are used to directly measure the degree of extension of reach assembly 800.

While reach assembly 800 is shown driven to extend and retract by electric motors 854, reach assembly 800 can also be driven to extend and retract by electric linear actuators, roller gears and a rack, a rack and pinion, a pin gear or sprocket and an attachment chain, or a similar device, system or apparatus. Reach assembly 800 is advantageously a fully-electrically powered system that does not require hydraulic components to extend or retract. Electric motors 854 can also include gearboxes such that the torque provided to roller pinions 856 is sufficient to extend/retract reach assembly 800. Reach assembly 800 can also include brakes configured to lock a current position of reach assembly 800 and facilitate preventing further extension/retraction of reach assembly 800. In some embodiments, the brakes are configured to engage drive shafts of electric motors 854.

Figure 6:
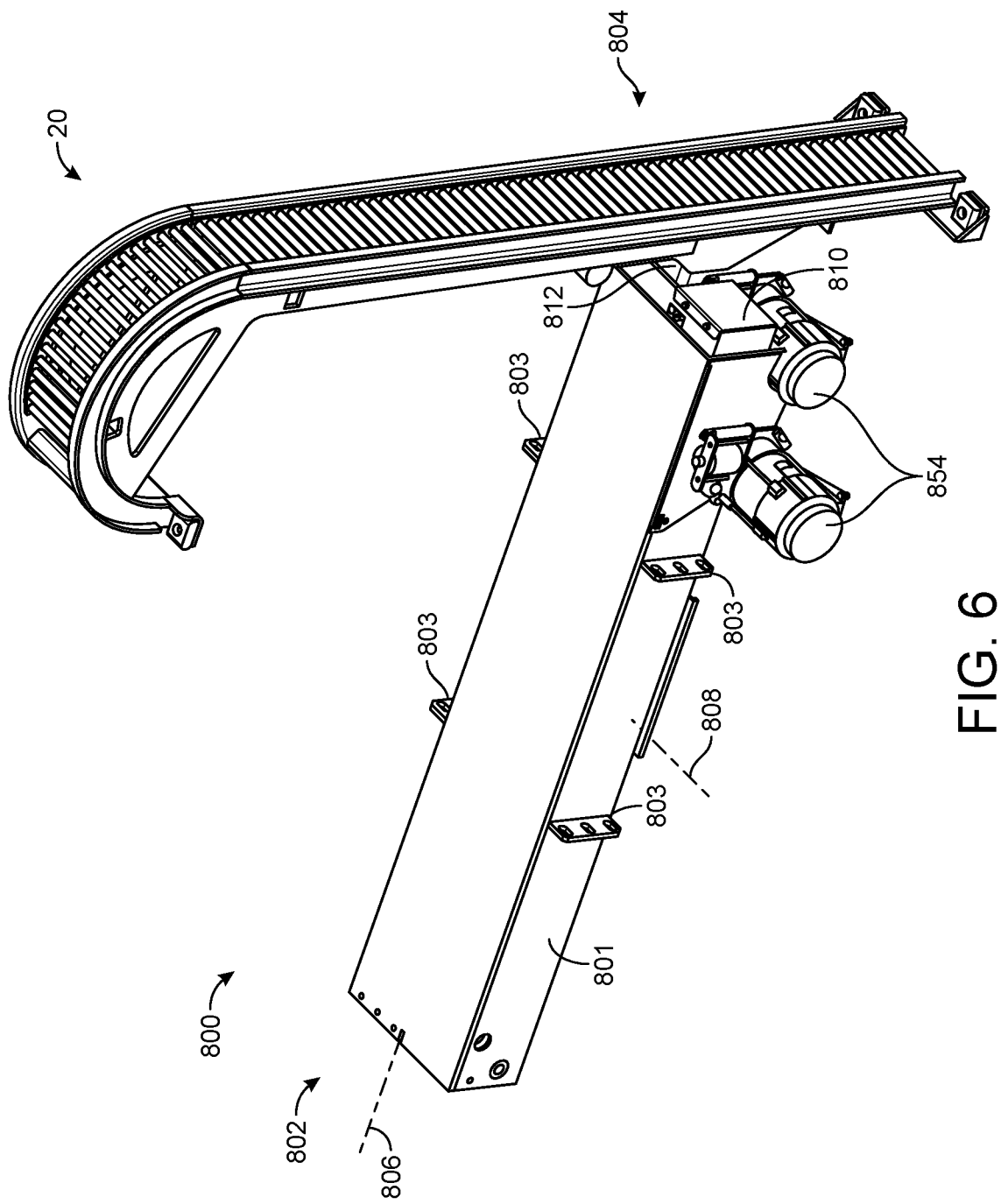
FIG. 6 is a perspective view of an electric reach assembly that can be used on the refuse vehicle of FIG. 1, according to an exemplary embodiment.
Figure 7:
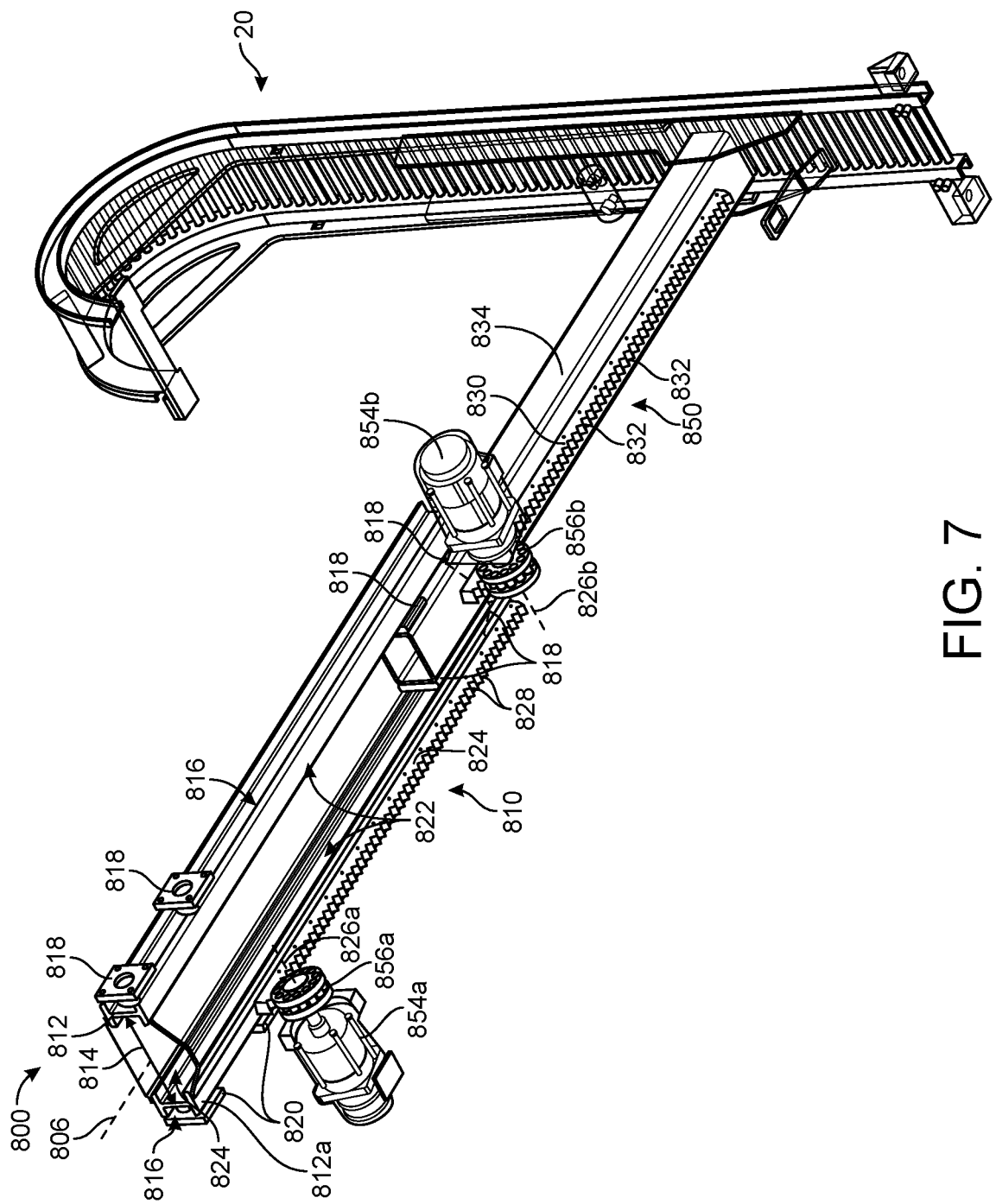
FIG. 7 is a perspective view of the electric reach assembly of FIG. 6, according to an exemplary embodiment.

Advantageously, reach assembly 800 as shown in FIGS. 6, 7, and 23-29 provides improved mechanical efficiency. Since reach assembly 800 uses a rack and roller pinion, the efficiency of torque that is converted to translational/longitudinal force is improved. Another advantage of using a rack and roller pinion reach assembly as shown in FIGS. 6 and 7 is improved lash control and precise location accuracy. Furthermore, using a rack and roller pinion reach assembly as shown in FIGS. 6, 7, and 23-29 facilitates an improved speed at which reach assembly 800 can extend and retract.

Finally, reach assembly 800 as shown in FIGS. 6 and 7 uses a rack and roller pinion and telescoping members to provide a durable and robust reach assembly.

Figure 8:
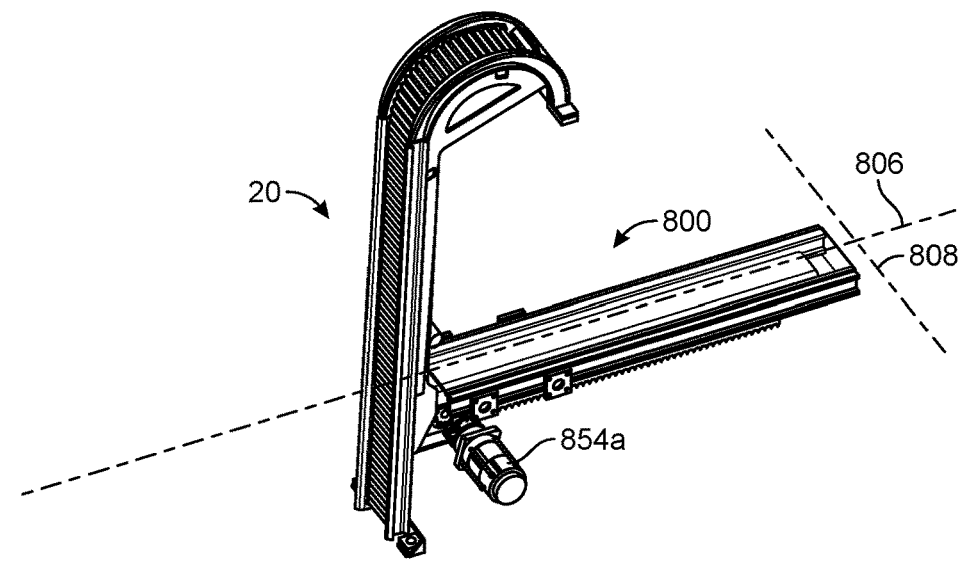
FIG. 8 is a perspective view of the electric reach assembly of FIG. 6 at a first degree of extension, according to an exemplary embodiment.
Figure 9:
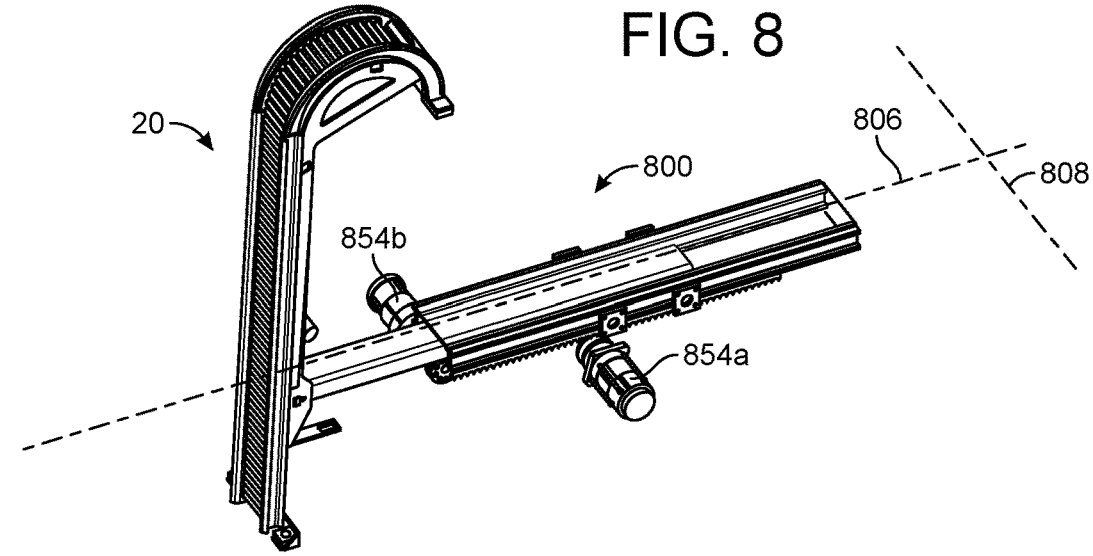
FIG. 9 is a perspective view of the electric reach assembly of FIG. 6 at a second degree of extension, according to an exemplary embodiment.
Figure 10:
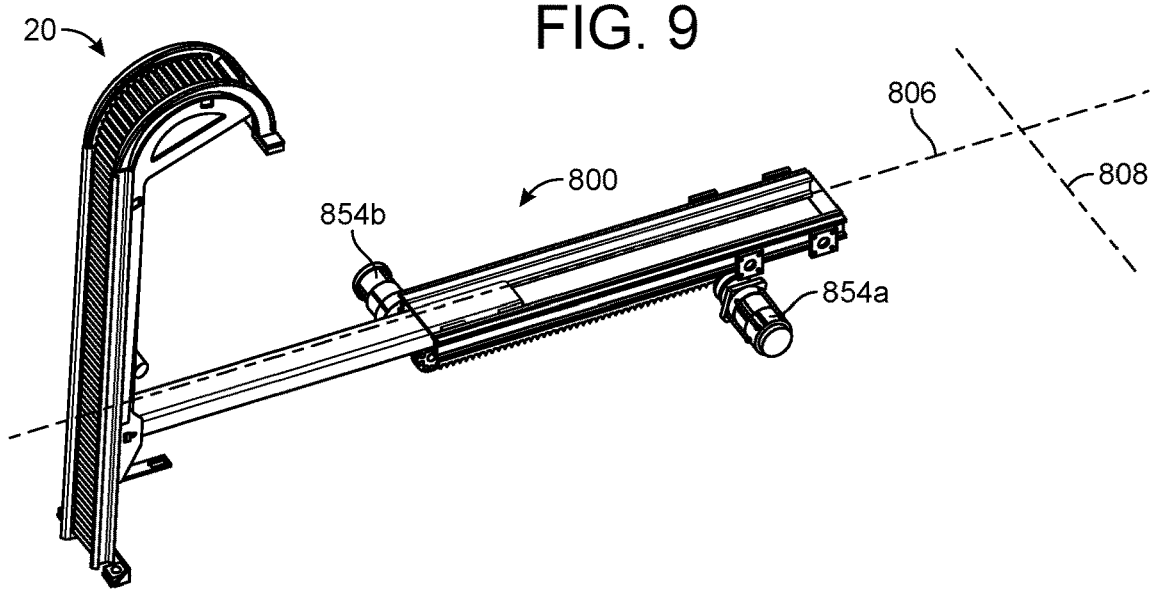
FIG. 10 is a perspective view of the electric reach assembly of FIG. 6 at a third degree of extension, according to an exemplary embodiment.

Referring now to FIGS. 8-10, reach assembly 800 can be extended and retracted to increase a distance therebetween a longitudinal axis 806 of refuse vehicle 10 and track 20. Specifically, an overall longitudinal length of reach assembly 800 increases as reach assembly 800 is driven by electric motors 854 to extend and decreases as reach assembly 800 is driven to retract.

FIG. 8 shows reach assembly 800 in a fully retracted configuration. FIG. 9 shows reach assembly 800 in a partially extended configuration. FIG. 10 shows reach assembly 800 in a fully extended configuration. Reach assembly 800 can extend or retract to facilitate reaching containers that are offset laterally from refuse vehicle 10. As shown in FIGS. 8-10, electric motor 854a remains stationary relative to track 20, since electric motor 854 is fixedly coupled with body 801 (which is fixedly coupled with refuse vehicle 10).

Figure 11:
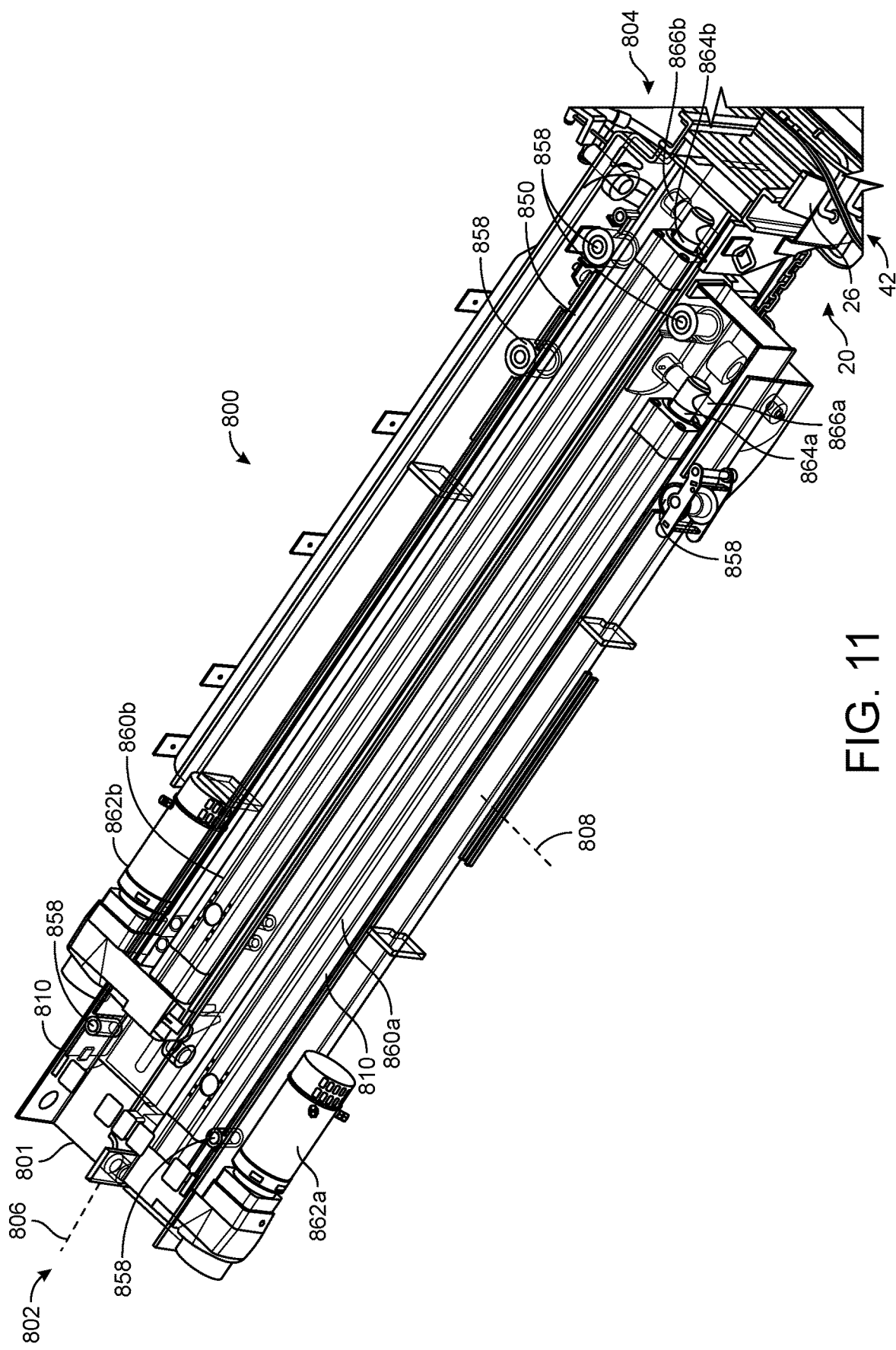
FIG. 11 is a perspective view of the electric reach assembly of FIG. 6 including electric linear actuators configured to extend the electric reach assembly, according to an exemplary embodiment.

Referring now to FIG. 11, reach assembly 800 can be configured to extend and retract by electric linear actuators 860. Specifically, electric linear actuator 860a is configured to translate extendable member 810 relative to body 801. Likewise, electric linear actuator 860b is configured to translate extendable member 850 relative to extendable member 810. Electric linear actuators 860 can be positioned therewithin reach assembly 800. Electric linear actuator 860a is positioned within body 801 and extendable member 810. Electric linear actuator 860a extends in the longitudinal direction defined by longitudinal axis 806. Electric linear actuator 860a is fixedly coupled at a first or proximate end with body 801 and fixedly coupled at a second or distal end (that is opposite the proximate end) with extendable member 810. In some embodiments, electric linear actuator 860a includes an extendable shaft, a rod, a piston, etc., shown as rod 864a that fixedly couples with extendable member 810 at the distal end. Rod 864 can include an aperture, a bore, a through hole, etc., that receives a member 866a that extends in the lateral direction and fixedly couples with extendable member 810 at the distal end.

Electric linear actuator 860b is configured to fixedly couple at a first or proximate end with extendable member 810 and at a second or distal end with extendable member 850. Specifically, rod 864b of electric linear actuator 860b is configured to fixedly couple with extendable member 850 at the second or distal end.

Electric linear actuators 860 both include electric motors 862. Electric motors 862 are configured to drive rods 864 to extend or retract, thereby extending and retracting reach assembly 800. In some embodiments, drive rods 864 are fixedly coupled with a linear screw that extends longitudinally therethrough electric linear actuators 860. Electric motors 862 are configured to drive the linear screw to cause drive rods 864 to translate linearly (e.g., to extend or retract). Electric motors 862 can drive rods 864 to linearly translate through a gearbox. Reach assembly 800 as shown in FIG. 11 can be operated similarly or the same as reach assembly 800 as shown in FIGS. 6, 7, and 8-10 and described in greater detail above.

Body 801 can include one or more rollers, roller bearings, pivotal members, rotatable members, etc., shown as rollers 858. Rollers 858 can be pivotally coupled with body 801 and can engage an exterior surface or face of extendable member 810. Rollers 858 can be driven to rotate or pivot or roll as extendable member 810 linearly translates relative to body 801. Specifically, the engagement between the exterior surface of extendable member 810 and rollers 858 drives rollers 858 to rotate as extendable member 810 linearly translates relative to body 801. Rollers 858 of body 801 can remain translationally stationary relative to body 801 such that rollers 858 of body 801 do not translate with extendable member 810.

Extendable member 810 can also include rollers 858 that are fixedly coupled with extendable member 810. Rollers 858 can engage a corresponding surface of body 801. Rollers 858 can be configured to pivot, rotate, or roll along the corresponding surface of body 801 as extendable member 810 is driven to translate relative to body 801.

Extendable member 810 can also include rollers 858 that are fixedly coupled with extendable member 810 and configured to engage a corresponding surface of extendable member 850. In some embodiments, as extendable member 850 is driven to translate relative to extendable member 810, rollers 858 that engage the corresponding surface of extendable member 850 are driven to rotate or roll along extendable member 850. Rollers 858 can translate with extendable member 810.

In some embodiments, electric linear actuators 860 include feedback sensors configured to provide a controller or control system of refuse vehicle 10 with a measured degree of extension of each electric linear actuator 860. In this way, a current extended length of reach assembly 800 can be monitored and measured. In some embodiments, electric linear actuators 860 and/or electric motors 862 include a brake. The brake can be configured to lock reach assembly 800 at a current degree of extension. The brake can be activated to facilitate preventing relative linear translation therebetween body 801, extendable member 810, and extendable member 850. In some embodiments, the brake is activated by a controller or a control system. In some embodiments, the brake is activated to maintain a current degree of extension of reach assembly 800 during transportation or when refuse vehicle 10 is shut down.

Figure 12:
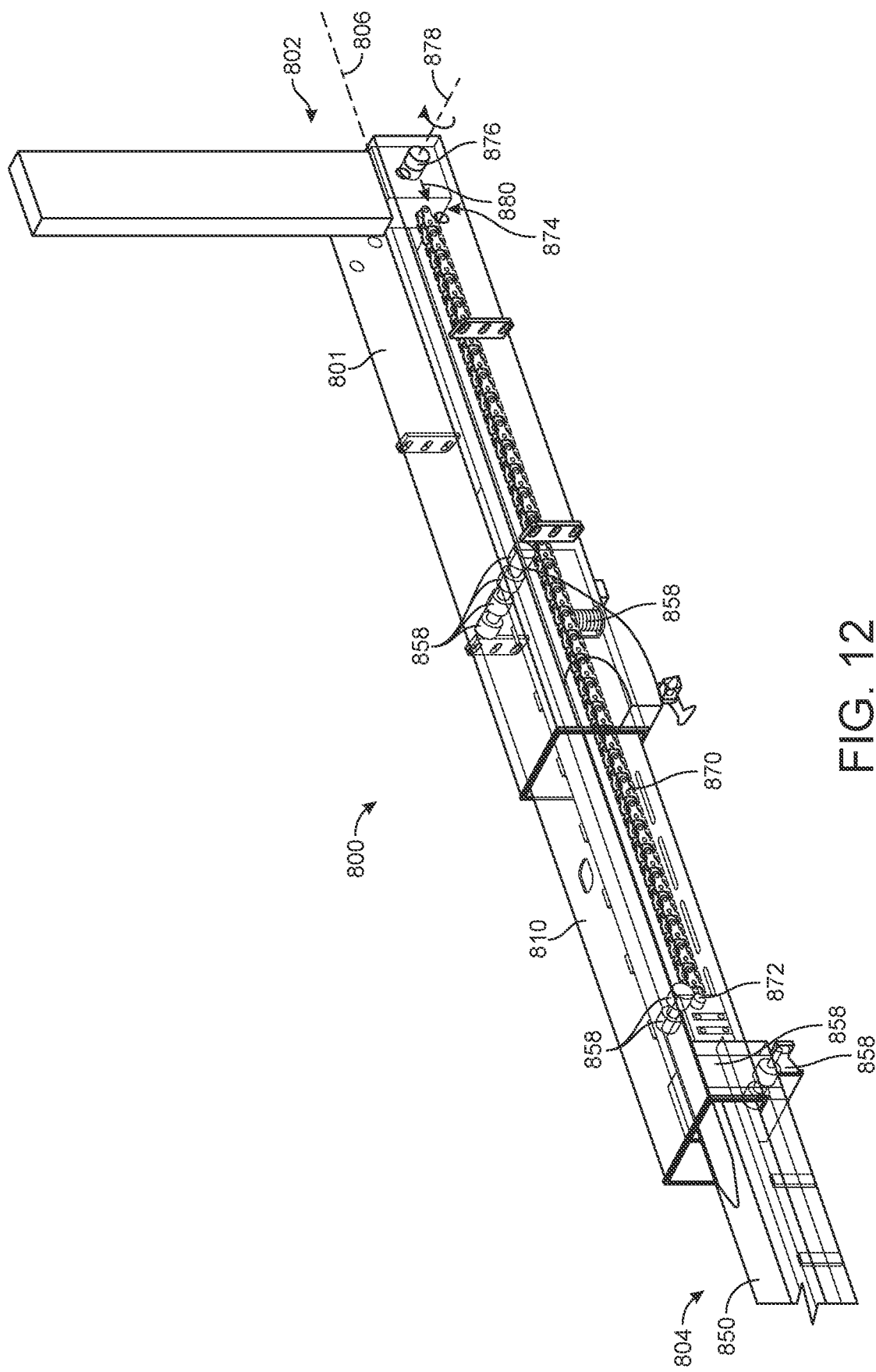
FIG. 12 is a perspective view of the electric reach assembly of FIG. 6 using a push chain system to extend and retract the electric reach assembly, according to an exemplary embodiment.

Referring now to FIG. 12, reach assembly 800 is shown according to another embodiment. Reach assembly 800 can be the same as or similar to the reach assemblies described in greater detail hereinabove. Reach assembly 800 can be driven to extend or retract along longitudinal axis 806 by a push chain 870. Push chain 870 can extend therethrough body 801, extendable member 810, and extendable member 850. Push chain 870 can include a first or proximate end 874 and a second or distal end 872. Push chain 870 includes linkages that pivotally coupled with each other. The linkages can be configured such that push chain 870 can contort, bend, bow, etc., in a first direction, but is prevented from contorting or deforming in a second, opposite, direction.

First or proximate end 874 of push chain 870 can be spooled about a drum, a disc, a gear, etc. The drum is configured to be driven rotate about axis 878 through shaft 876. Shaft 876 can be driven by an electric mover 884 (e.g., an electric motor, an electric linear actuator, etc.). Rotating shaft 876 in a first direction (e.g., clockwise about axis 878) drives distal end 872 of push chain 870 to linearly translate in the longitudinal direction, thereby pushing extendable member 850 and extendable member 810 to extend. Likewise, rotating shaft 876 in a second direction (e.g., counter clockwise about axis 878) drives distal end 872 in a direction towards refuse vehicle 10 in the longitudinal direction, thereby retracting reach assembly 800. Rotating shaft 876 in the second direction causes push chain 870 to spool up or wind about the drum. In some embodiments, electric mover 884 is an electric linear actuator that is configured to extend or retract to provide a pushing force to extendable member 850 through push chain 870.

When shaft 876 is rotated in the first direction about axis 878 as shown in FIG. 12, a pushing force 880 is transferred through push chain 870 that drives reach assembly 800 to extend. When shaft 876 is rotated in the second direction about axis 878, a pulling force that acts in a direction opposite pushing force 880 is transferred through push chain 870 that drives reach assembly 800 to retract. Both pushing force 880 and the pulling force can act in a direction that is substantially parallel with longitudinal axis 806.

Reach assembly 800 can include both laterally oriented and vertically oriented rollers 858. Rollers 858 can be disposed therebetween adjacent members that translate relative to each other. For example, a first set of laterally oriented rollers 858 can be positioned therebetween body 801 and extendable member 810. The first set of laterally oriented rollers 858 can be fixedly coupled with body 801 and engage an outer surface of extendable member 810 such that as extendable member 810 translates linearly relative to body 801, rollers 858 are driven to rotate. A second set of laterally oriented rollers 858 that is similar to the first set of laterally oriented rollers 858 can be positioned therebetween extendable member 810 and extendable member 850.

Referring now to FIGS. 14-17, a reach apparatus 1100 includes a frame member, a body member, a support member, a structural member, etc., shown as frame 1104. Reach apparatus 1100 can be the same as or similar to reach assembly 800 and may be configured to facilitate extension or retraction of grabber assembly 42 in a lateral direction relative to refuse vehicle 10. In some embodiments, reach apparatus 1100 is usable with refuse vehicle 10 instead of reach assembly 800, such that whatever is said of reach assembly 800 in use with refuse vehicle 10 may be said of reach apparatus 1100. Frame 1104 includes a first gear or sprocket, shown as sprocket 1124 and a second gear or sprocket, shown as sprocket 1126. First sprocket 1124 and second sprocket 1126 are spaced apart along a longitudinal length of frame 1104. First sprocket 1124 and second sprocket 1126 are pivotally or rotatably coupled with frame 1104. First sprocket 1124 and second sprocket 1126 are translationally fixed to frame 1104 but are free to rotate.

Frame 1104 includes a rack 1122 that extends along the entirety of the longitudinal length of frame 1104. Rack 1122 includes teeth 1136 that are configured to engage or mesh with a drive gear or a pinion 1120. Pinion 1120 can be mounted to a driveshaft of electric motor 1102 and is configured to be driven to rotate by electric motor 1102. Driving electric motor 1102 causes frame 1104 to translate in the longitudinal direction.

Reach apparatus 1100 includes a chain 1118 (e.g., a power transmitting band, a belt, a tensile member, etc.). Chain 1118 is configured to engage first sprocket 1124 (e.g., a power transmitting drum, a rotatable member, a cogged wheel, a wheel, a drive member, a rotatable drive member, a rotational drive member, etc.) and second sprocket 1126 (e.g., a power transmitting drum, a rotatable member, a cogged wheel, a wheel, a drive member, a rotatable drive member, a rotational drive member, etc.) and can wrap around both first sprocket 1124 and second sprocket 1126. Chain 1118 can be a closed-loop chain (e.g., without free ends). Electric motor 1102 can be driven to translate frame 1104 in direction 1128 or in a direction that is opposite direction 1128. Chain 1118 includes multiple links 1130 that are pivotally coupled with each other.

Reach apparatus 1100 includes a first rigid member 1106 and a second rigid member 1108. First rigid member 1106 and second rigid member 1108 can be substantially parallel to each other. First rigid member 1106 includes a bar, a beam, a protrusion, an elongated member, etc., shown as member 1114. Member 1114 is fixedly coupled or integrally formed with a generally planar member 1110. Likewise, second rigid member 1108 includes a member 1116 that is similar the same as member 1114. Member 1116 is fixedly coupled or integrally formed with a generally planar member 1112 that is substantially parallel and the same as generally planar member 1110.

Member 1114 and member 1116 are integrally formed with one of links 1130. For example, member 1114 can be integrally formed with one of links 1130 on a first lateral side of reach apparatus 1100, while member 1116 can be integrally formed with one of links 1130 on a second lateral side of reach apparatus 1100 that is opposite the first side.

Generally planar member 1110 and generally planar member 1112 can be a portion of or integrally formed with telescoping members. For example, generally planar member 1110 can be fixedly coupled with body 801 while generally planar member 1112 can be fixedly coupled with extendable member 810. Similarly, generally planar member 1110 can be fixedly coupled with extendable member 810 with generally planar member 1112 being fixedly coupled to extendable member 850. In some embodiments, first rigid member 1106 is integrally formed with or fixedly coupled with As electric motor 1102 drives frame 1104 to translate in direction 1128 through the engagement between pinion 1120 and teeth 1136 of rack 1122, a longitudinal distance therebetween generally planar member 1110 and generally planar member 1112 increases. As electric motor 1102 drives frame 1104 to translate in a direction opposite direction 1128 through the engagement between pinion 1120 and teeth 1136 of rack 1122, the longitudinal distance therebetween generally planar member 1110 and generally planar member 1112 decreases.

Figure 15:
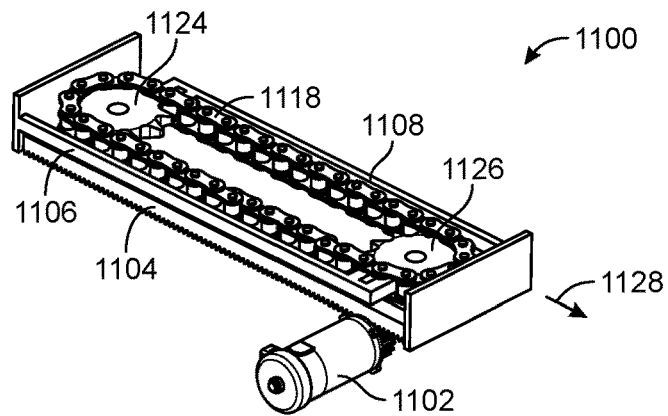
FIG. 15 is a perspective view of the chain drive system of FIG. 14 at a first degree of extension, according to an exemplary embodiment.
Figure 16:
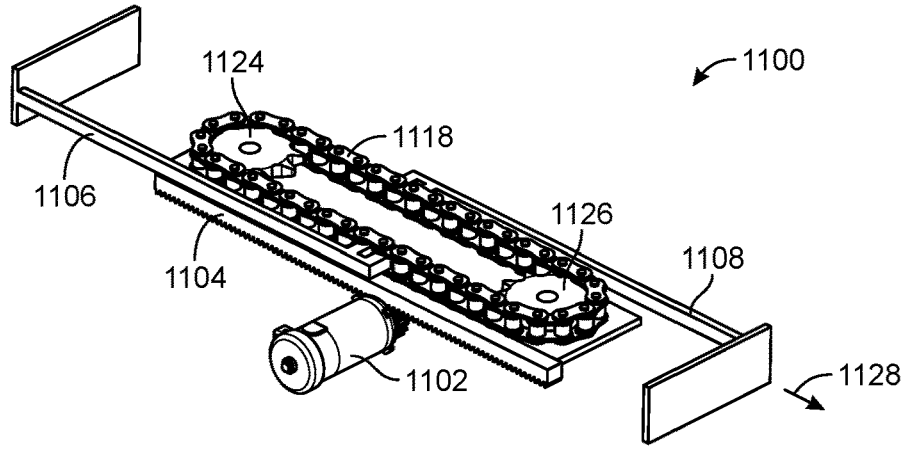
FIG. 16 is a perspective view of the chain drive system of FIG. 14 at a second degree of extension, according to an exemplary embodiment.
Figure 17:
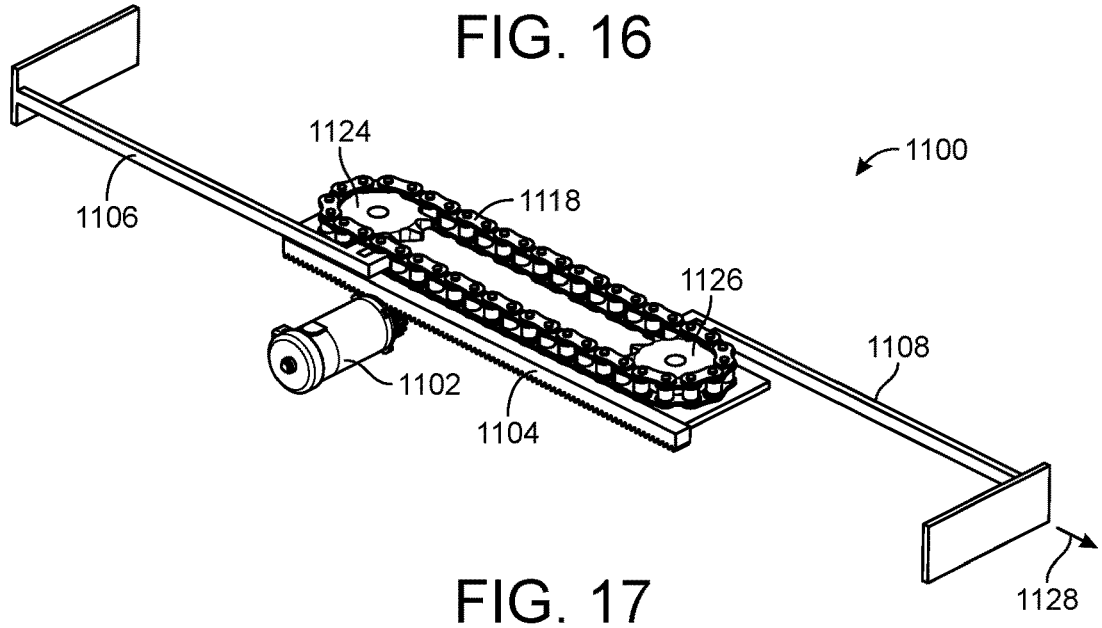
FIG. 17 is a perspective view of the chain drive system of FIG. 14 at a third degree of extension, according to an exemplary embodiment.

Referring to FIGS. 15-17, the operation of reach apparatus 1100 is shown. FIG. 15 shows reach apparatus 1100 in a fully retracted configuration. FIG. 16 shows reach apparatus 1100 in a partially extended configuration. FIG. 17 shows reach apparatus 1100 in a fully extended configuration. It should be noted that electric motor 1102 is shown remaining stationary relative to frame 1104 and can be fixedly coupled with first rigid member 1106. It should be understood that while reach apparatus 1100 is shown as including a chain and sprockets, reach apparatus 1100 can be configured using belts and drums, cables and wheels, etc.

Reach apparatus 1100 is driven to extend and retract (e.g., to transition between the states shown in FIGS. 15-17) by electric motor 1102. Electric motor 1102 drives frame 1104 to translate in direction 1128, thereby driving first sprocket 1124 and second sprocket 1126 to rotate. As first sprocket 1124 and second sprocket 1126 are driven to rotate, chain 1118 rolls/rotates due to the engagement therebetween chain 1118 and sprockets 1124 and 1126. This drives second rigid member 1108 to translate relative to first rigid member 1106, thereby extending second rigid member 1108.

Electric motor 1102 can be operated in either direction to extend or retract reach apparatus 1100. In some embodiments, first sprocket 1124 or second sprocket 1126 are driven directly by electric motor 1102. For example, first sprocket 1124 and/or second sprocket 1126 can be mounted to a shaft that is driven by electric motor 1102.

Figure 13:
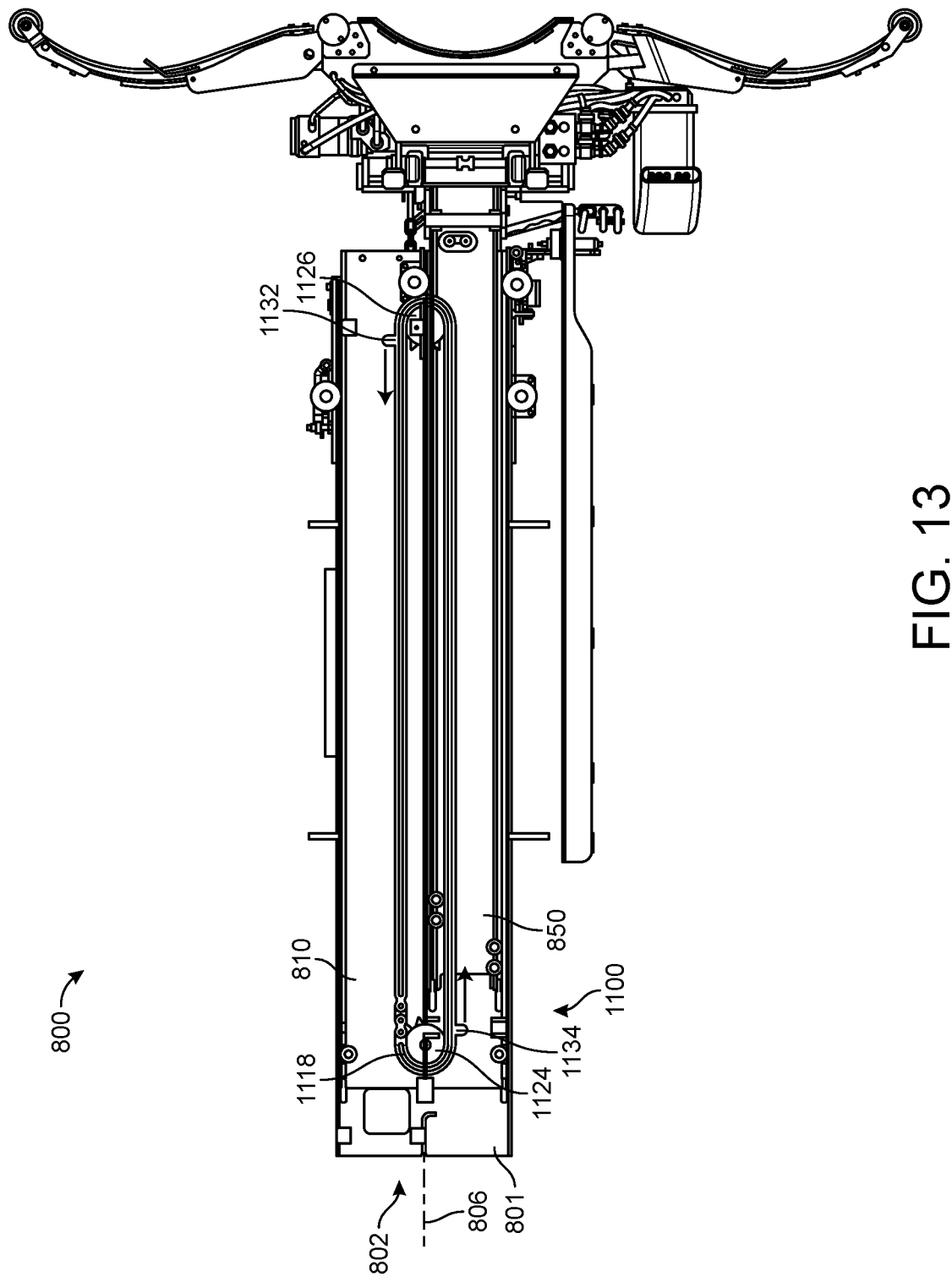
FIG. 13 is a top view of the electric reach assembly of FIG. 6 including a chain drive system configured to extend and retract the electric reach assembly, according to an exemplary embodiment.
Figure 14:
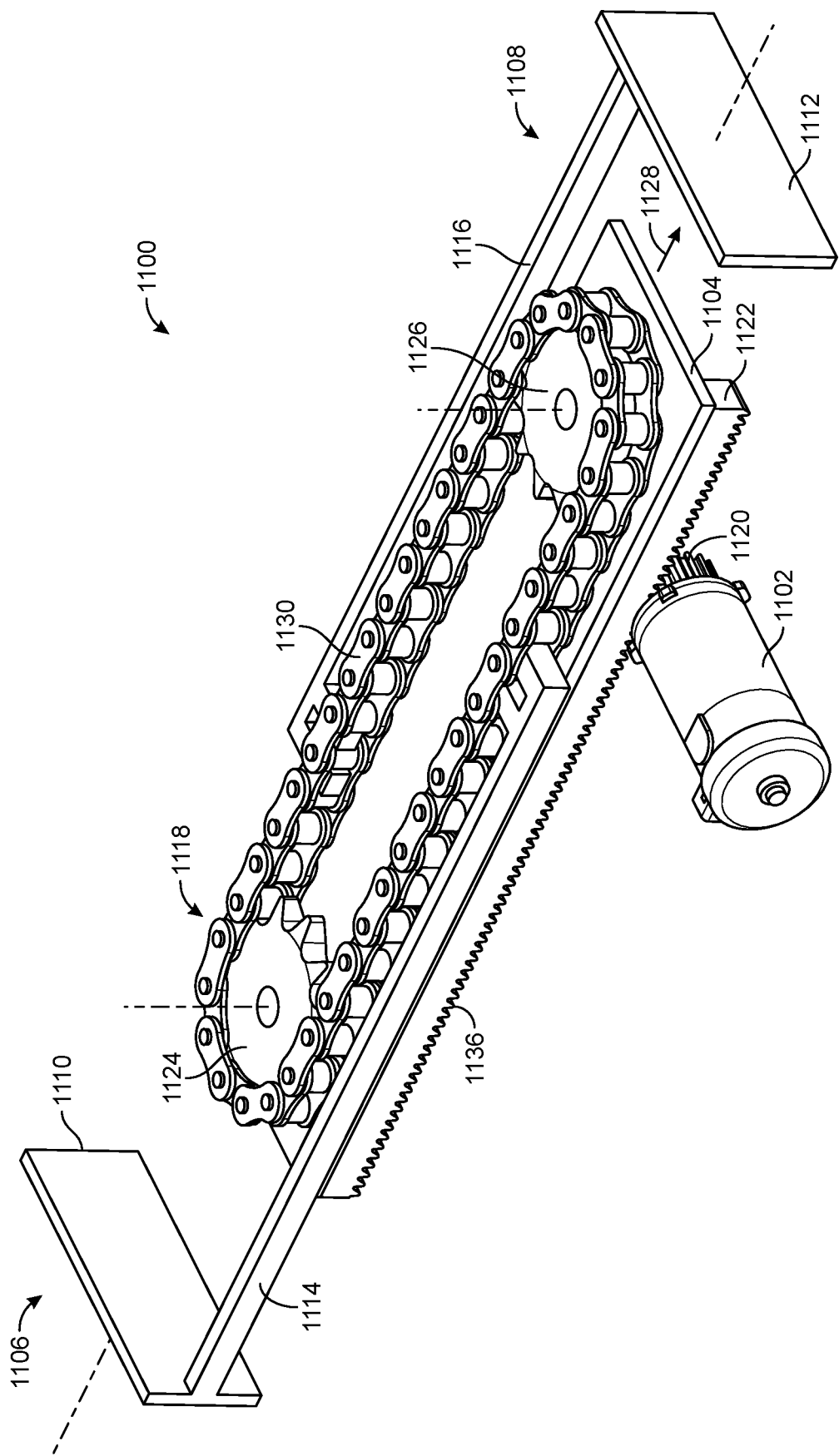
FIG. 14 is a perspective view of the chain drive system of the electric reach assembly of FIG. 13, according to an exemplary embodiment.

Referring now to FIG. 13, reach apparatus 1100 is shown configured to extend and retract reach assembly 800. Reach apparatus 1100 can be driven at first sprocket 1124 or second sprocket 1126 by an electric motor with a gear box. In some embodiments, first sprocket 1124 and second sprocket 1126 are rotatably coupled and translationally fixed to extendable member 810. In this way, extendable member 810 can function as frame 1104. Extendable member 810 can include a rack similar or the same as rack 1122 and can be driven to translate by electric motor 1102 and pinion 1120.

Chain 1118 wraps around first sprocket 1124 and second sprocket 1126 and engages first sprocket 1124 and second sprocket 1126. Chain 1118 includes a first protrusion 1132 and a second protrusion 1134. First protrusion 1132 and second protrusion 1134 extend from opposite sides of chain 1118. First protrusion 1132 and second protrusion 1134 are each fixedly coupled or integrally formed with a corresponding link of chain 1118. First protrusion 1132 can fixedly couple with a rigid member, a bar, a beam, a tubular member, etc. The rigid member extends therebetween first profusion 1132 and body 801, fixedly coupling the first corresponding linkage of chain 1118 with body 801. Similarly, second protrusion 1134 is fixedly coupled or integrally formed with a rigid member that extends between second protrusion 1134 and extendable member 850, thereby fixedly coupling the second corresponding link of chain 1118 with extendable member 850.

Reach apparatus 1100 can be operated similarly as shown in FIGS. 15-17 to extend and retract reach assembly 800. Specifically, reach apparatus 1100 can be configured to extend and retract extendable member 850 relative to extendable member 810, while concurrently or simultaneously extending or retracting extendable member 850 relative to body 801.

Advantageously, using reach apparatus 1100 to extend reach assembly 800 does not require a translatable motor. For example, the electric motor used to drive reach apparatus 1100 can be fixedly coupled with a stationary member or portion of reach assembly 800. This facilitates easy access of the motor for maintenance and servicing, and reduces the likelihood that the electric motor will contact an obstruction while translating with one of extendable member 850 and/or extendable member 810.

Figure 18:
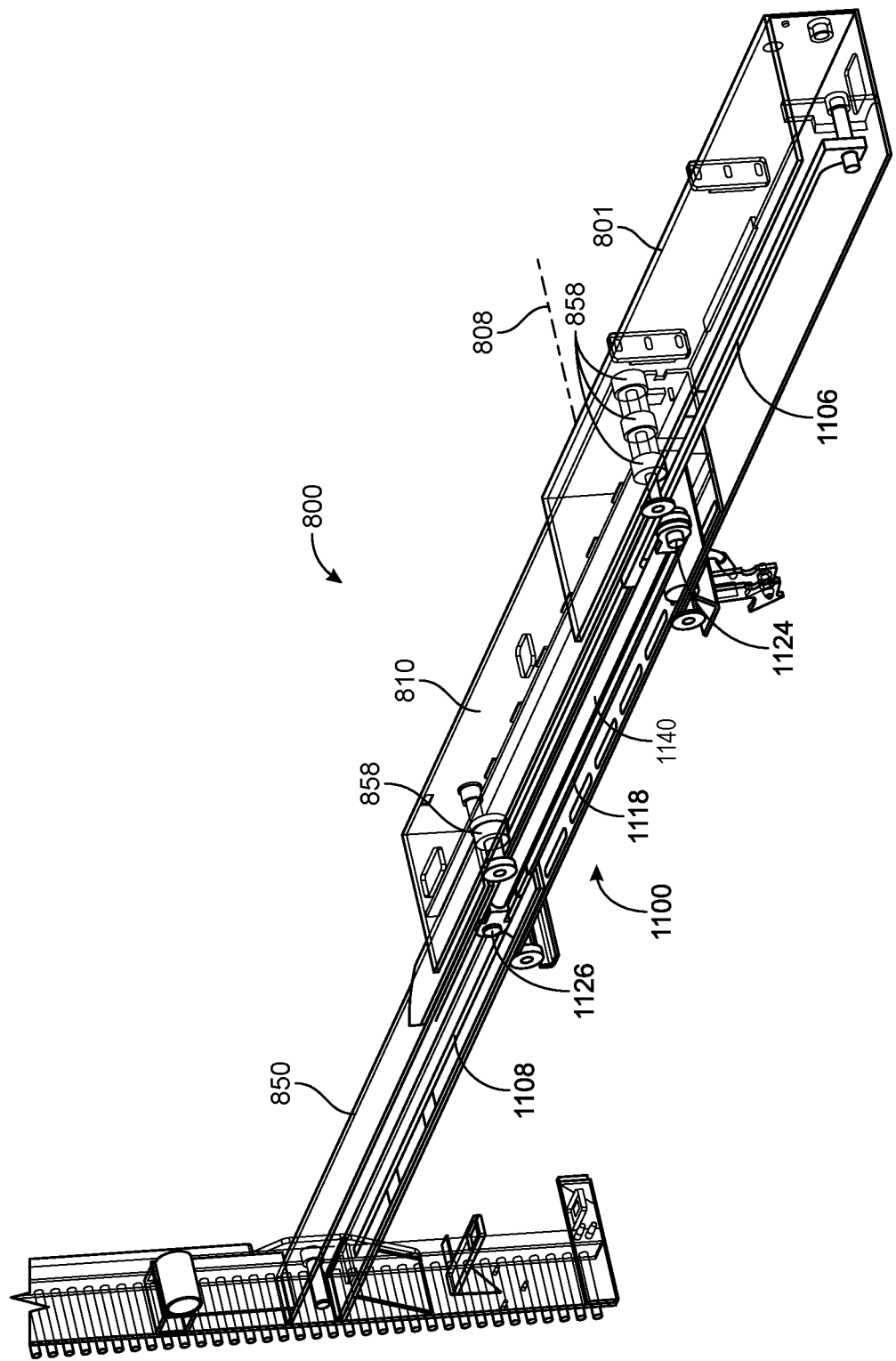
FIG. 18 is a perspective view of the electric reach assembly of FIG. 6 with the chain drive system of FIG. 14, according to an exemplary embodiment.

Referring now to FIG. 18, reach apparatus 1100 can also be used with reach assembly 800 in a different orientation. Reach apparatus 1100 can be substantially parallel with side members of reach assembly 800. For example, the axes that first sprocket 1124 and second sprocket 1126 rotate about can be substantially parallel with lateral axis 808.

In some embodiments, first sprocket 1124 and second sprocket 1126 are rotatably coupled with elongated member 1140 at opposite ends of elongated member 1140. Elongated member 1140 can function similarly to frame 1104. Elongated member 1140 can be fixedly coupled with extendable member 810 such that extendable member 810 and elongated member 1140 translate together. First sprocket 1124 or second sprocket 1126 engage chain 1118. First sprocket 1124 or second sprocket 1126 can be driven by an electric motor to simultaneously or concurrently translate extendable member 810 relative to body 801 and extendable member 850 relative to extendable member 810. First rigid member 1106 is fixedly coupled with a corresponding link of chain 1118 at one end, and fixedly coupled with body 801 at an opposite end. Second rigid member 1108 is fixedly coupled with a corresponding link of chain 1118 at one end, and fixedly coupled with extendable member 850 at an opposite end.

Figure 19:
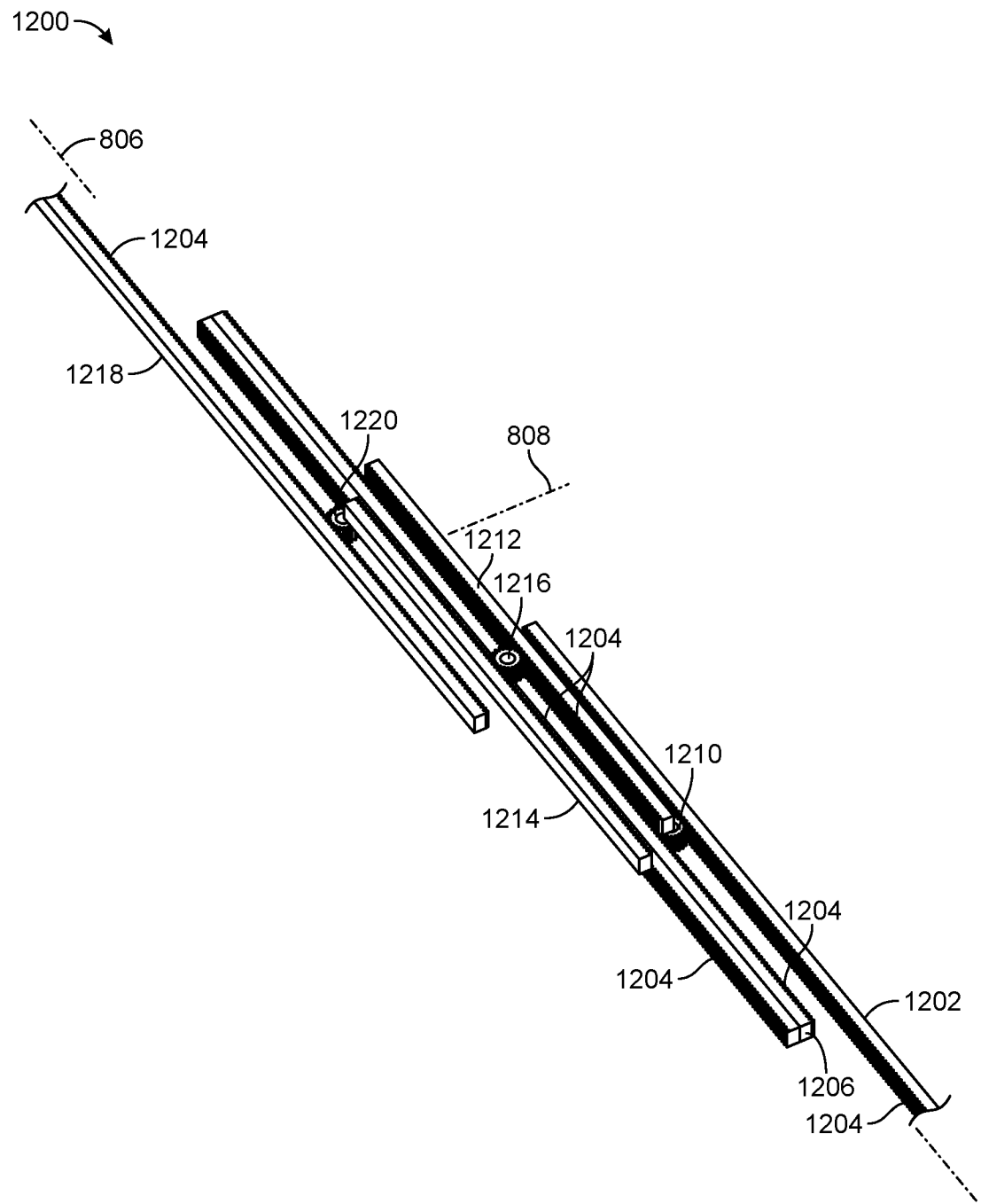
FIG. 19 is a perspective view of a triple rack system, according to an exemplary embodiment.
Figure 20:
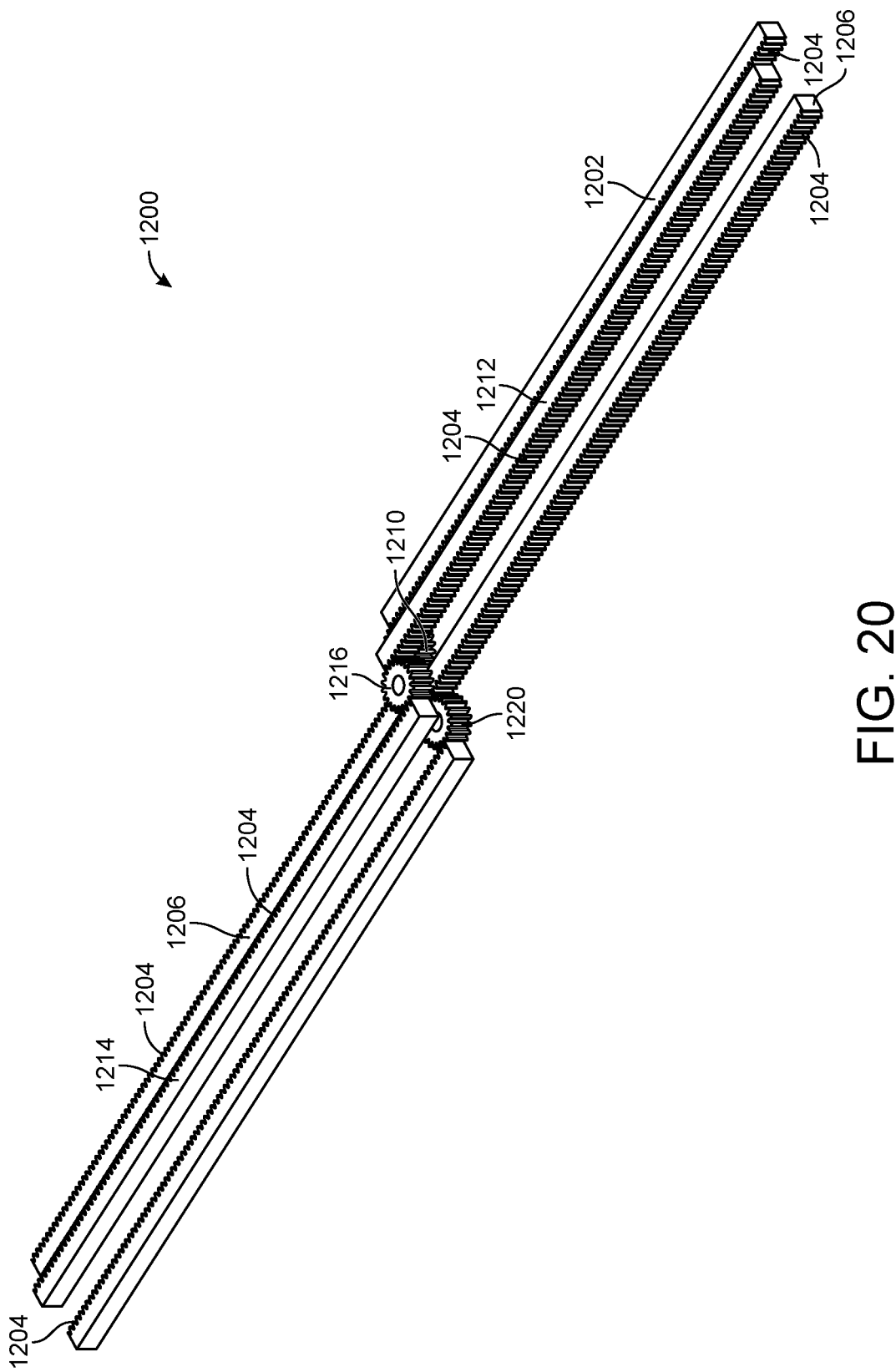
FIG. 20 is a perspective view of the triple rack system of FIG. 19, according to an exemplary embodiment.

Referring now to FIGS. 19 and 20, a triple rack apparatus 1200 includes a variety of elongated members. Triple rack apparatus 1200 is usable with reach assembly 800 and can share any of the functionality, configuration, etc., of reach assembly 800. For example, triple rack apparatus 1200 can be used with refuse vehicle 10 and may be configured to facilitate movement of grabber assembly 42 relative to refuse vehicle 10 (e.g., to facilitate access to refuse containers that are laterally offset or otherwise positioned a distance away from refuse vehicle 10). The elongated members can be bars, beams, square members, rectangular members, racks, elongated toothed members, etc. The elongated members are all rigid members and may all be parallel to each other. In some embodiments, all of the elongated members are parallel to each other and parallel to longitudinal axis 806. Stationary elongated member 1202 can be fixedly coupled with body 801 of reach assembly 800. Stationary elongated member 1202 may be configured to remain stationary as rack apparatus 1200 is driven to extend or retract. Rack apparatus 1200 can be used with reach assembly 800 to facilitate translation of extendable member 850 relative to extendable member 810 concurrently or simultaneously with translation of extendable member 810 relative to body 801. In some embodiments, if rack apparatus 1200 is used with reach assembly 800, translation of extendable member 810 relative to body 801 produces translation of extendable member 850 relative to extendable member 810.

Rack apparatus 1200 includes an intermediate or input or driven or central elongated member 1206. Intermediate elongated member 1206 can translate relative to stationary elongated member 1202. Intermediate elongated member 1206 can be fixedly coupled with extendable member 810. Intermediate elongated member 1206 includes teeth 1204 formed or defined on opposing lateral sides. Stationary elongated member 1202 can also include teeth 1204 on an inner facing surface that points towards teeth 1204 of intermediate elongated member 1206. A gear, a pinion gear, a roller, a drive member, etc., shown as pinion gear 1210 is positioned therebetween stationary elongated member 1202 and intermediate elongated member 1206. Pinion gear 1210 is configured to engage and mesh with teeth 1204 of stationary elongated member 1202 and intermediate elongated member 1206.

Rack apparatus 1200 includes an output elongated member 1218. Output elongated member 1218 can be configured to translate relative to intermediate elongated member 1206. Output elongated member 1218 includes teeth 1204 on a laterally inwards facing surface or face. A pinion gear 1220 is disposed therebetween output elongated member 1218 and intermediate elongated member 1206 and is configured to engage teeth 1204 of output elongated member 1218 and intermediate elongated member 1206.

Referring still to FIG. 19, rack apparatus 1200 includes a first coupling elongated member 1212 and a second coupling elongated member 1214. First coupling elongated member 1212 and second coupling elongated member 1214 include teeth 1204 on laterally inwards facing surfaces. A pinion gear 1216 is disposed therebetween first coupling elongated member 1212 and second coupling elongated member 1214 and is configured to engage and mesh with teeth 1204 of first coupling elongated member 1212 and second coupling elongated member 1214. Pinion gear 1216 can be slidably coupled with a corresponding surface of intermediate elongated member 1206.

First coupling elongated member 1212 is pivotally or rotatably coupled with pinion gear 1210 at a first or proximate end. Pinion gear 1210 can be translatably fixed at the first end of first coupling elongated member 1212 but is free to rotate. Second coupling elongated member 1214 is pivotally or rotatably coupled with pinion gear 1220 at a second or distal end that is opposite the proximate end of first coupling elongated member 1212. Pinion gear 1220 can be translatably fixed at the distal end of second coupling elongated member 1214 but is also free to rotate or can be driven to rotate.

Intermediate elongated member 1206 can be driven to translate relative to stationary elongated member 1202 by providing an input force to intermediate elongated member 1206. The input force can be provided to intermediate elongated member 1206 by an electric linear actuator. As intermediate elongated member 1206 is driven to translate relative to stationary elongated member 1202, output elongated member 1218 is also driven to translate relative to intermediate elongated member 1206 due to the engagement of pinion gears 1220, 1216, and 1210, and the corresponding elongated members. In this way, a single electric linear actuator can be used to translate intermediate elongated member 1206 relative to stationary elongated member 1202 while simultaneously or concurrently translating output elongated member 1218 relative to intermediate elongated member 1206.

Referring particularly to FIG. 20, rack apparatus 1200 is shown according to another embodiment. Intermediate member 1206 can include teeth 1204 on only one of the lateral sides along a first portion and on only an opposite one of the lateral sides along a second portion.

Figure 21:
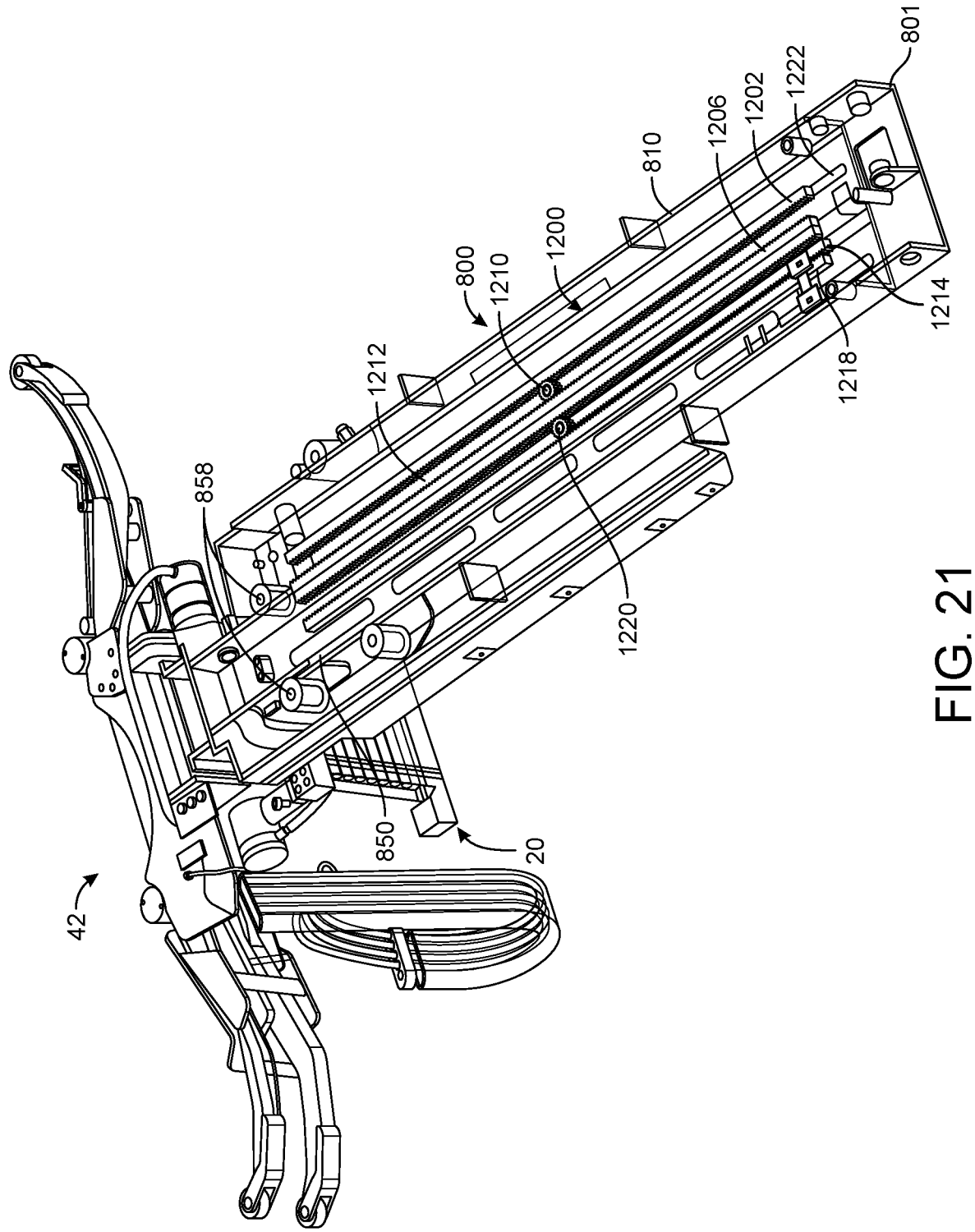
FIG. 21 is a perspective view of the reach assembly of FIG. 6 with the triple rack system of FIG. 19 in a fully retracted state, according to an exemplary embodiment.
Figure 22:
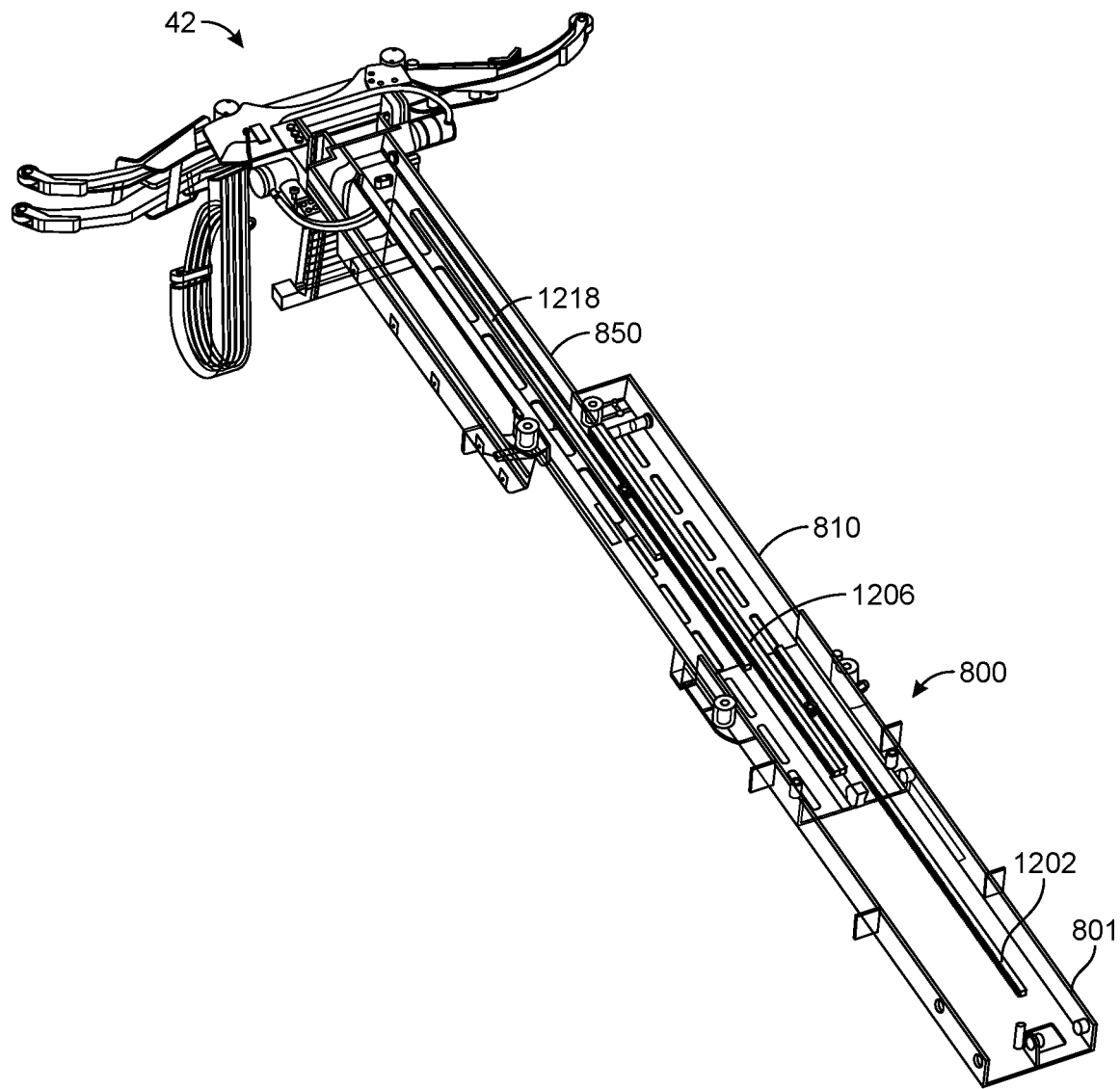
FIG. 22 is a perspective view of the reach assembly of FIG. 21 in a fully extended state, according to an exemplary embodiment.
Figure 26:
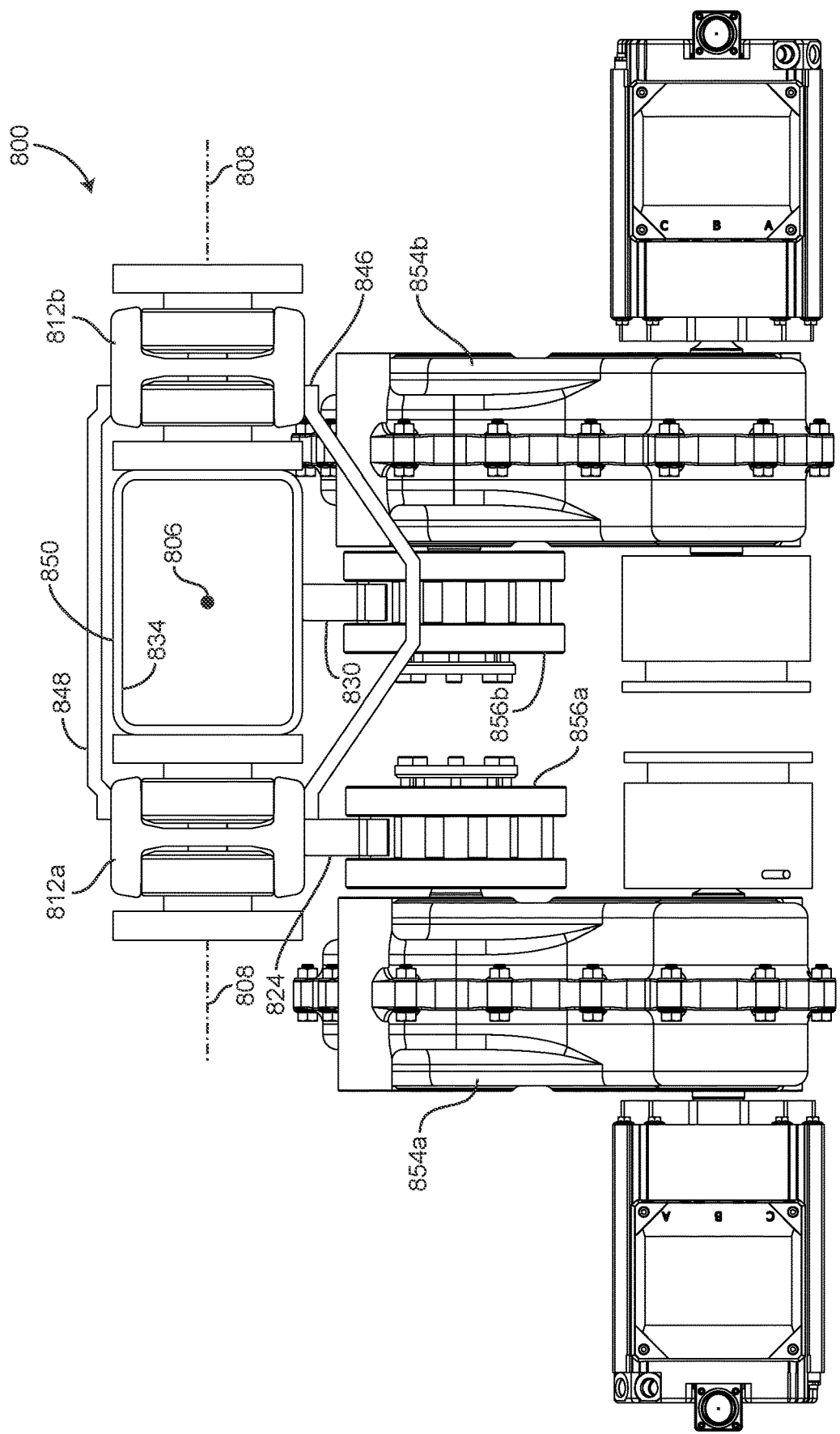
FIG. 26 is a rear view of the reach assembly of FIG. 6, according to an exemplary embodiment.
Figure 27:
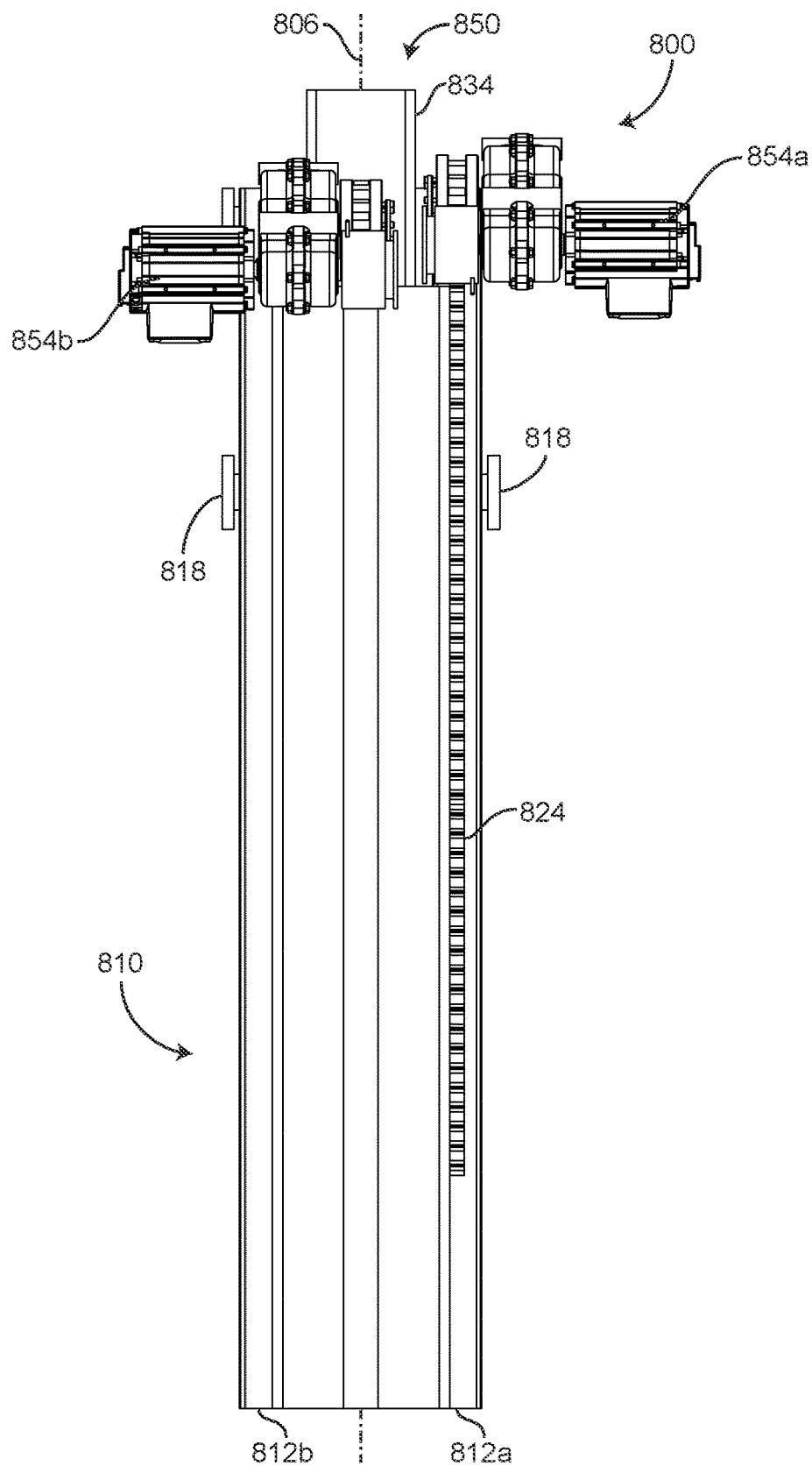
FIG. 27 is a bottom view of the reach assembly of FIG. 6, according to an exemplary embodiment.
Figure 28:
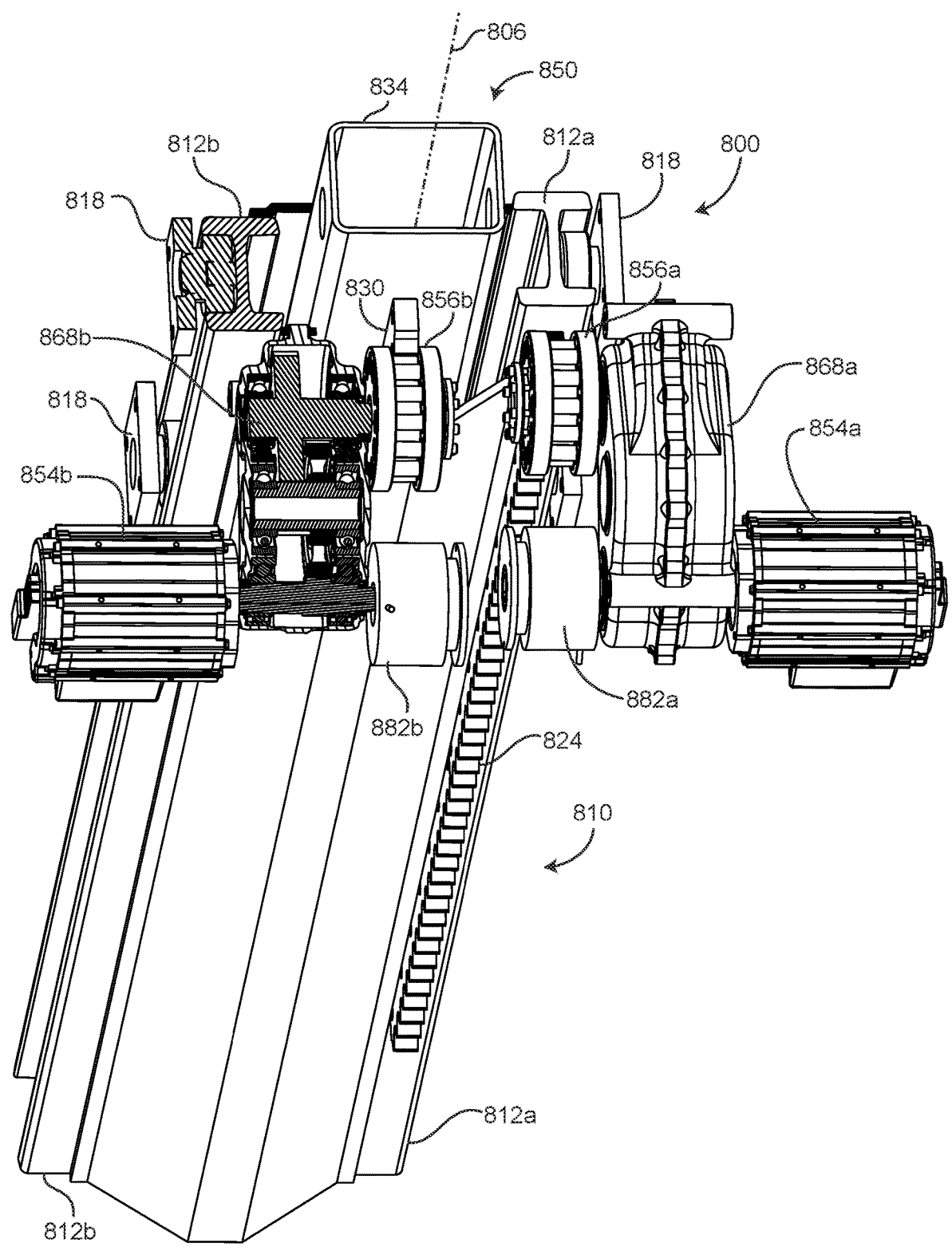
FIG. 28 is a perspective view of the reach assembly of FIG. 6, according to an exemplary embodiment.
Figure 29:
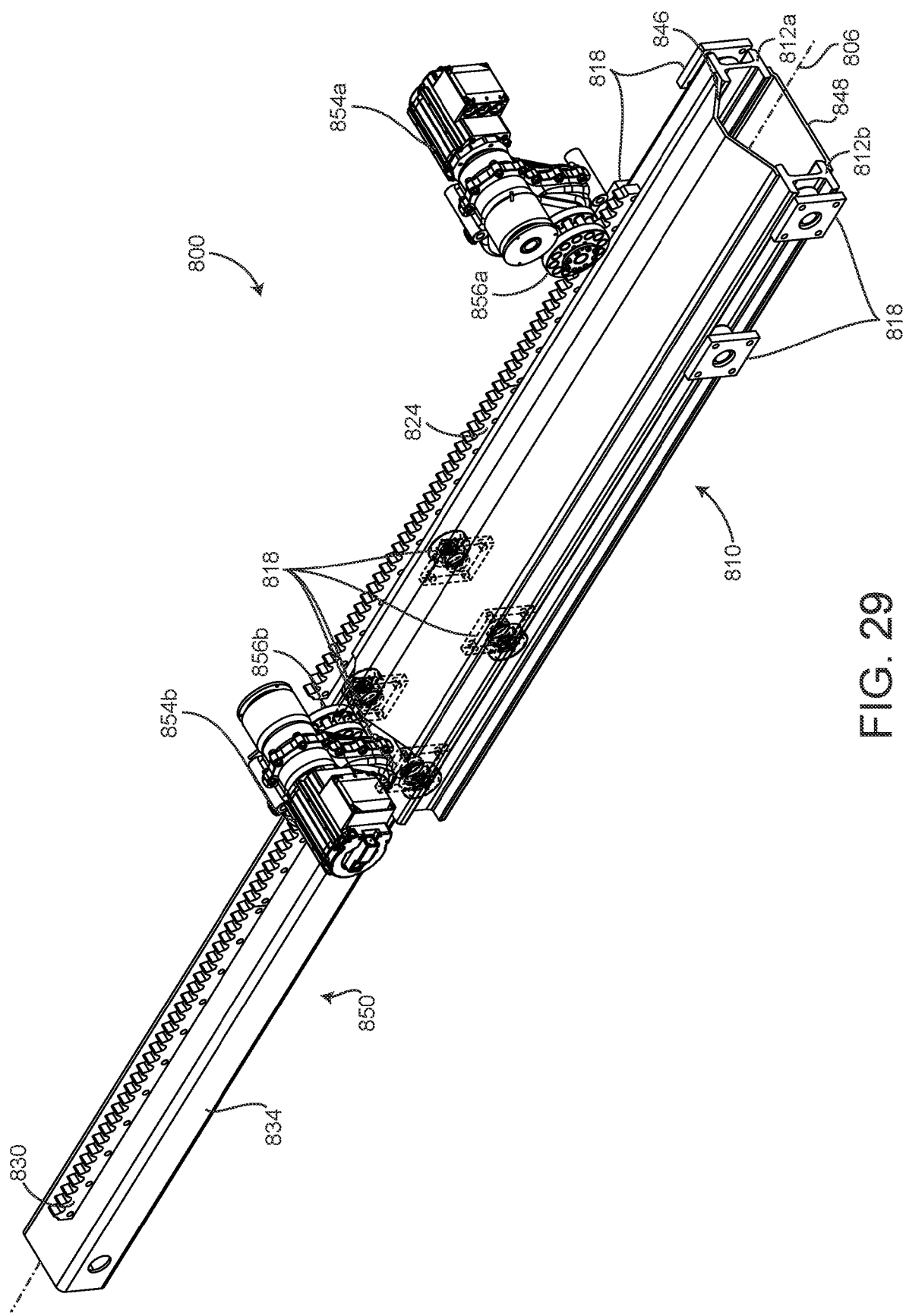
FIG. 29 is a perspective view of the reach assembly of FIG. 6, according to an exemplary embodiment.

Referring now to FIGS. 21 and 22, rack apparatus 1200 can be implemented in reach assembly 800. Stationary elongated member 1202 is fixedly coupled with body 801. Intermediate elongated member 1206 is fixedly coupled with extendable member 810. Output elongated member 1218 is fixedly coupled with extendable member 850. Second coupling elongated member 1214 can be configured to slidably couple with extendable member 810. In some embodiments, second coupling elongated member 1214 is received within a groove, a track, a recess, etc., shown as track 1222 of extendable member 810. First coupling elongated member 1212 may also be configured to slidably couple with extendable member 810 similarly to second coupling elongated member 1214 (e.g., in a similar track 1222).

FIG. 21 shows rack apparatus 1200 and reach assembly 800 in a fully retracted configuration/state, while FIG. 22 shows rack apparatus 1200 and reach assembly 800 in a fully extended configuration/state. Rack apparatus 1200 and reach assembly 800 can be transition between the fully extended state and the fully retracted state (or to a partially retracted or partially extended state) by driving or exerting a force upon intermediate elongated member 1206. An electric linear actuator can be configured to fixedly couple at one end with body 801 and fixedly couple at an opposite end with intermediate elongated member 1206. The electric linear actuator can be operated to extend or retract to transition rack apparatus 1200 and reach assembly 800 from the fully retracted state shown in FIG. 21 to the fully extended state shown in FIG. 22, or to a partially extended state.

Advantageously, all of the reach assemblies described herein are fully electric systems or are configured to be driven by electric motors (or electric linear actuators), thereby facilitating a fully electric reach assembly. While the various electric systems described herein are shown implemented with particular reach assembly configurations, any of the electric systems, the electric rack and pinion systems, the gearing systems, electric linear actuators, electric motors, etc., or components thereof can be used with various other telescoping reach assemblies. Advantageously, a fully-electric reach assembly reduces the need for a hydraulic system, is more environmentally friendly, and facilitates a more robust reach assembly.

It should be understood that any of the electric motors, electric linear actuators, electric devices, etc., can receive electrical energy/power from a battery system including one or more battery devices or any other energy storage devices. Similarly, any of the electric motors, electric linear actuators, or electrical devices described herein can be operated by a controller or a control system. The controller can include a processing circuit, memory, a processor, computer readable medium, etc., and may store instructions for operating any of the functions of the reach assembly. The controller can generate control signals and provide the control signals to any of the electrical devices (e.g., the electric motors) described herein.

It should also be noted that any of the electric motors, electric linear actuators, etc., can include a brake that can lock or facilitate restricting rotational output from an output driveshaft of any of the electric motors. For example, any of the electric motors can include a drum brake configured to activate and provide a frictional force to the electric motor driveshaft to facilitate preventing rotation of the driveshaft thereof. The brake can be activated using mechanical systems, or an electrical system. For example, the brake may be an electrically activated drum brake, a mechanical brake, an electrical brake, etc. The brake can be configured to decrease output speed of the driveshaft of the electric motor or to facilitate locking a current angular position of the driveshaft of the electric motor. The brake can be operated by the same controller or control system that operates the electric motors and electric linear actuators, or can be operated by a separate control system and/or a separate controller. Additionally, any of the electric motors or linear electric actuators described herein can include appropriate gearboxes to increase or decrease output torque. The brake can be activated when the refuse vehicle is shut down, or when the reach apparatus is powered off, or in response to a user input.

It should also be noted that any of the electrical motors, electrical actuators, or any other electrical movers can include any number of sensors configured to measure and monitor an angular position or a degree of extension. In some embodiments, the sensors are a component of the electric motors or the electric linear actuators and provide feedback signals to the controller. The controller can monitor the sensor signals to identify an angular position or a degree of extension of the electric motors or the electric linear actuators, respectively. The controller can use the sensor signal to determine a current degree of extension of reach assembly 800. In some embodiments, extension of reach assembly 800 is directly measured (e.g., with a distance sensor, with a proximity sensor, etc.).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A reach assembly for a refuse vehicle, the reach assembly comprising:
   an outer member fixedly coupled with the refuse vehicle;
   a plurality of telescoping members, each of the telescoping members comprising a rack extending in a longitudinal direction, wherein an outermost one of the plurality of telescoping members comprises a lift apparatus;
   a plurality of electric motors, each fixedly coupled with one of the telescoping members and configured to drive a pinion that engages the rack of an adjacent one of the telescoping members; and
   a plurality of electric brakes, each of the plurality of electric brakes configured to activate to engage an output shaft of a corresponding one of the plurality of electric motors;
   wherein the plurality of electric motors are configured to drive the plurality of telescoping members to telescope to translate the lift apparatus.

2. The reach assembly of claim 1, wherein the plurality of telescoping members comprise:
   a first extendable member configured to be received within an inner volume of the outer member and translate relative to the outer member in a longitudinal direction of the outer member, the first extendable member comprising a first rack extending in the longitudinal direction; and
   a second extendable member configured to be received within an inner volume of the first extendable member and translate relative to the first extendable member in the longitudinal direction, the second extendable member comprising a second rack extending in the longitudinal direction, wherein the lift apparatus is fixedly coupled at an outer end of the second extendable member.

3. The reach assembly of claim 2, wherein the plurality of electric motors comprise:
   a first electric motor fixedly coupled with the outer member and configured to drive a first pinion configured to engage the first rack to translate the first extendable member relative to the outer member; and
   a second electric motor fixedly coupled with the first extendable member and configured to drive a second pinion configured to engage the second rack to translate the second extendable member relative to the first extendable member.

4. The reach assembly of claim 3, further comprising:
   a first gearbox configured to receive rotational kinetic energy from the first electric motor and drive the first pinion to translate the first extendable member relative to the outer member; and
   a second gearbox configured to receive rotational kinetic energy from the second electric motor and drive the second pinion to translate the second extendable member relative to the first extendable member.

5. The reach assembly of claim 4, wherein the plurality of electric brakes comprise:
   a first electric brake configured to activate to engage an output shaft of the first electric motor; and
   a second electric brake configured to activate to engage an output shaft of the second electric motor.

6. The reach assembly of claim 5, wherein activation of the first electric brake restricts relative translation of the first extendable member relative to a body of the refuse vehicle and activation of the second electric brake restricts relative translation of the second extendable member relative to the first extendable member.

7. The reach assembly of claim 1, wherein the outer member comprises:
   a plurality of linear bearings fixedly coupled with the outer member;
   a first of the plurality of telescoping members comprises:
   a first frame member and a second frame member offset from each other in a lateral direction, each of the first frame member and the second frame member extending in the longitudinal direction and defining a longitudinally extending track along laterally outwards facing sides of the first frame member and the second frame member; and
a plurality of linear bearings fixedly coupled with laterally inwards facing sides of the first frame member and the second frame member;
wherein the plurality of linear bearings of the outer member are received within the longitudinally extending tracks to slidably couple the first of the plurality of telescoping members with the outer member; and
a second of the plurality of telescoping members comprises:
a pair of laterally outwards facing surfaces configured to slidably engage the plurality of linear bearings of the first of the plurality of telescoping members to slidably couple the second of the plurality of telescoping members the first of the plurality of telescoping members.

8. The reach assembly of claim 7, wherein the first of the plurality of telescoping members comprises a pair of laterally extending members that extend between the first frame member and the second frame member, wherein the first frame member, the second frame member, and the pair of laterally extending members define the inner volume of the first of the plurality of telescoping members.

9. The reach assembly of claim 1, wherein the outer member receives a first end of a first of the plurality of telescoping members through the inner volume of the outer member, wherein a second of the plurality of electric motors is fixedly coupled with the first of the plurality of telescoping members at a second end of the first of the plurality of telescoping members, wherein the second end is opposite the first end of the first of the plurality of telescoping members.

10. The reach assembly of claim 1, wherein the lift apparatus comprises:
a track comprising a straight portion and a curved portion; and
a grabber assembly configured to releasably grasp a refuse container and ascend or descend the track.

11. The reach assembly of claim 1, wherein the reach assembly is a fully-electric apparatus configured to only use electrical energy to extend or retract.

12. A refuse vehicle comprising:
a chassis;
a plurality of tractive elements coupled with the chassis and configured to support the refuse vehicle; and
a reach assembly comprising:
an outer member fixedly coupled with the refuse vehicle;
a plurality of telescoping members, each of the telescoping members comprising a rack extending in a longitudinal direction, wherein an outermost one of the plurality of telescoping members comprises a lift apparatus;
a plurality of electric motors, each fixedly coupled with one of the telescoping members and configured to drive a pinion that engages the rack of an adjacent one of the telescoping members; and
a plurality of electric brakes, each of the plurality of electric brakes configured to activate to engage an output shaft of a corresponding one of the plurality of electric motors;
wherein the plurality of electric motors are configured to drive the plurality of telescoping members to telescope to translate the lift apparatus.

13. The refuse vehicle of claim 12,
wherein the plurality of telescoping members comprise:
a first extendable member configured to be received within an inner volume of the outer member and translate relative to the outer member in a longitudinal direction of the outer member, the first extendable member comprising a first rack extending in the longitudinal direction; and
a second extendable member configured to be received within an inner volume of the first extendable member and translate relative to the first extendable member in the longitudinal direction, the second extendable member comprising a second rack extending in the longitudinal direction, wherein the lift apparatus is fixedly coupled at an outer end of the second extendable member; and
wherein the plurality of electric motors comprise:
a first electric motor fixedly coupled with the outer member and configured to drive a first pinion configured to engage the first rack to translate the first extendable member relative to the outer member; and
a second electric motor fixedly coupled with the first extendable member and configured to drive a second pinion configured to engage the second rack to translate the second extendable member relative to the first extendable member.

14. The refuse vehicle of claim 13, further comprising:
a first gearbox configured to receive rotational kinetic energy from the first electric motor and drive the first pinion to translate the first extendable member relative to the outer member; and
a second gearbox configured to receive rotational kinetic energy from the second electric motor and drive the second pinion to translate the second extendable member relative to the first extendable member.

15. The refuse vehicle of claim 14, wherein the plurality of electric brakes comprise:
a first electric brake configured to activate to engage an output shaft of the first electric motor; and
a second electric brake configured to activate to engage an output shaft of the second electric motor.

16. The refuse vehicle of claim 15, wherein activation of the first electric brake restricts relative translation of the first extendable member relative to a body of the refuse vehicle and activation of the second electric brake restricts relative translation of the second extendable member relative to the first extendable member.

17. The refuse vehicle of claim 12, wherein the outer member comprises:
a plurality of linear bearings fixedly coupled with the outer member;
a first of the plurality of telescoping members comprises:
a first frame member and a second frame member offset from each other in a lateral direction, each of the first frame member and the second frame member extending in the longitudinal direction and defining a longitudinally extending track along laterally outwards facing sides of the first frame member and the second frame member; and
a plurality of linear bearings fixedly coupled with laterally inwards facing sides of the first frame member and the second frame member;
wherein the plurality of linear bearings of the outer member are received within the longitudinally extending tracks to slidably couple the first of the plurality of telescoping members with the outer member; and a second of the plurality of telescoping members comprises:
  a pair of laterally outwards facing surfaces configured to slidably engage the plurality of linear bearings of the first of the plurality of telescoping members to slidably couple the second of the plurality of telescoping members the first of the plurality of telescoping members;
  wherein the first of the plurality of telescoping members comprises a pair of laterally extending members that extend between the first frame member and the second frame member, wherein the first frame member, the second frame member, and the pair of laterally extending members define the inner volume of the first of the plurality of telescoping members.

18. The refuse vehicle of claim 12, wherein the outer member receives a first end of a first of the plurality of telescoping members through the inner volume of the outer member, wherein a second of the plurality of electric motors is fixedly coupled with the first of the plurality of telescoping members at a second end of the first of the plurality of telescoping members, wherein the second end is opposite the first end of the first of the plurality of telescoping members.

19. The refuse vehicle of claim 12, wherein the reach assembly is a fully-electric apparatus configured to only use electrical energy to extend or retract.

20. A fully-electric reach assembly for a refuse vehicle, the reach assembly comprising:
  an outer member fixedly coupled with the refuse vehicle;
  a first extendable member configured to be received within an inner volume of the outer member and translate relative to the outer member in a longitudinal direction of the outer member, the first extendable member comprising a first rack extending in the longitudinal direction; and
  a second extendable member configured to be received within an inner volume of the first extendable member and translate relative to the first extendable member in the longitudinal direction, the second extendable member comprising a second rack extending in the longitudinal direction, wherein the lift apparatus is fixedly coupled at an outer end of the second extendable member;
  a first electric motor fixedly coupled with the outer member and configured to drive a first pinion configured to engage the first rack to translate the first extendable member relative to the outer member; and
  a second electric motor fixedly coupled with the first extendable member and configured to drive a second pinion configured to engage the second rack to translate the second extendable member relative to the first extendable member;
  a first gearbox configured to receive rotational kinetic energy from the first electric motor and drive the first pinion to translate the first extendable member relative to the outer member;
    a second gearbox configured to receive rotational kinetic energy from the second electric motor and drive the second pinion to translate the second extendable member relative to the first extendable member;
  a first electric brake configured to activate to engage an output shaft of the first electric motor; and
  a second electric brake configured to activate to engage an output shaft of the second electric motor.

* * * * *